United States Patent [19]
Lamagna

[11] Patent Number: 5,662,419
[45] Date of Patent: Sep. 2, 1997

[54] TIME-TEMPERATURE MONITOR AND RECORDING DEVICE AND METHOD FOR USING THE SAME

[75] Inventor: David J. Lamagna, Andover, Mass.

[73] Assignee: Andover Monitoring Systems, Inc., Andover, Mass.

[21] Appl. No.: 487,276

[22] Filed: Jun. 7, 1995

[51] Int. Cl.$^6$ .................................................. G01K 11/06
[52] U.S. Cl. ........................... 374/160; 374/102; 374/106; 426/88; 116/219
[58] Field of Search .................................. 374/101, 102, 374/104, 105, 106, 160, 161, 162; 116/217, 218, 219; 426/88

[56] References Cited

U.S. PATENT DOCUMENTS

| | | | |
|---|---|---|---|
| 3,082,624 | 3/1963 | Renier | 374/102 |
| 3,336,212 | 8/1967 | Nicholas et al. | 374/102 |
| 3,362,834 | 1/1968 | Kaye | 116/219 |
| 3,954,011 | 5/1976 | Manske | 116/219 |
| 3,965,741 | 6/1976 | Wachtell et al. | 374/160 |
| 4,327,117 | 4/1982 | Lenack et al. | 426/88 |
| 4,382,700 | 5/1983 | Youngren | 374/102 |
| 4,432,656 | 2/1984 | Allmendinger | 426/88 |
| 4,488,822 | 12/1984 | Brennan | 374/101 |

*Primary Examiner*—G. Bradley Bennett

[57] ABSTRACT

A time-temperature monitor is provided that is adapted for indicating the amount of accumulated time during which the ambient temperature adjacent to the monitor is above a predetermined temperature. The time-temperature monitor comprises a viscous, non-Newtonian fluid biased within a flow path defining element, with the rate of flow therethrough being regulated by a constricting orifice disposed in a nozzle that is positioned in fluid communication with the flow path defining element.

20 Claims, 16 Drawing Sheets

TIME-TEMPERATURE MONITOR AND RECORDING DEVICE AND METHOD FOR USING THE SAME

FIELD OF THE INVENTION

The present invention relates to temperature monitoring devices in general, and more particularly to disposable temperature monitoring devices for recording and indicating the length of time that perishable materials are exposed to elevated temperatures.

BACKGROUND OF THE INVENTION

A time-temperature indicating device often accompanies a shipment of perishable items so as to provide a record of the temperatures those items have been exposed to during their journey. For example, such devices are typically included with shipments of fresh and frozen foods, photographic materials, and/or pharmaceutical products. These and other products are often sensitive to small increases in storage temperature, even if they are held at the elevated temperature for only a short period of time. Absent a time-temperature indicating device, the receiver of such products may not be able to determine whether those products have been exposed to harmful elevated temperatures, or the duration of that exposure.

Relatively expensive temperature recording devices, that are capable of recording temperature on a time basis, are well known. For example, chart recorders and/or electronically controlled temperature recording devices are available that can record variations in the ambient temperature on a time basis. Unfortunately, these devices are often too costly to be considered for individual containers, or in particular, for disposable applications.

Disposable devices capable of indicating when a specific temperature has been reached are also well known in the art. For example, U.S. Pat. No. 3,954,011, issued May 4, 1976, to Manske, teaches an indicating device suitable for visibly indicating time, temperature, and time-temperature relationships. The device consists of a porous fluid carrying pad, a wick material, and an indicating means. The device is adapted to regulate the migration of the fluid from the fluid source to the wick material as a function of temperature. Calibrated indicating means are provided to show the progress of the fluid along the wick material as a function of time. In this way, the device is adapted to indicate and measure the passage of time, the exposure to a given minimum temperature, or a time-temperature relationship. Unfortunately, such devices are frequently susceptible to tampering, thus rendering them unreliable. Additionally, devices of this type many times do not give an immediate indication of the specific temperature level that has been attained or the time interval over which that temperature exposure occurred.

As a result of these deficiencies in the prior art, inexpensive time-temperature indicators have been devised to minimize the foregoing problems. For example, U.S. Pat. No. 4,488,822 discloses a time-temperature indicator comprising first and second compartments that are in fluid communication with one another. A first liquid, having a predetermined freezing point, is disposed in a portion of the first compartment. The second compartment is adapted to contain a pressurized fluid. In operation, the first liquid is forced out of the first compartment, at a controlled rate by the pressurized fluid in the second compartment, when the ambient temperature is above the freezing point of the first liquid. Flow control means, such as a porous barrier, are disposed between the first and second compartments so as to regulate the rate at which the pressurized fluid forces the first fluid through the first compartment. Manual means are provided for pressurizing the second fluid.

Such devices are capable of indicating the interval of time that a product has been exposed to temperatures above a predetermined temperature. Unfortunately, these devices invariably use fluids that must be frozen, i.e., be maintained at or below 0° C. prior to use. Thus these devices often incorporate water-based fluids that make them ineffective for elevated temperature environments, i.e. at or above room temperature.

OBJECTS OF THE INVENTION

A primary object of the present invention is to provide an improved time-temperature monitoring device suitable for use over a broad range of temperatures.

Another object of the present invention is to provide an improved time-temperature monitoring device that indicates the accumulated time during which the ambient temperature adjacent to the monitor is above a predetermined reference temperature.

Still another object of the present invention is to provide an improved time-temperature monitoring device that is capable of being conveniently located in a shipping container or vehicle.

Yet another object of the present invention is to provide an improved time-temperature monitoring device that is tamper proof.

A further object of the present invention is to provide an improved time-temperature monitoring device that is suitable for use with a variety of perishable items.

A still further object of the present invention is to provide an improved time-temperature monitoring device that is not required to be subjected to temperatures below 32° F. (0° C.) prior to use.

Another object of the present invention is to provide an improved time-temperature monitoring device that incorporates a fluid capable of non-Newtonian flow behavior.

And another object of the present invention is to provide an improved time-temperature monitoring device that may be economically disposed of after use.

Yet another object of the present invention is to provide an improved method for monitoring, recording, and indicating the accumulated time during which the ambient temperature adjacent to perishable items is above a predetermined reference temperature.

SUMMARY OF THE INVENTION

These and other objects are achieved by the provision and use of a novel time-temperature monitor that is adapted for indicating the amount of accumulated time during which the ambient temperature adjacent to the monitor is above a predetermined temperature. The time-temperature monitor of the present invention relies upon a viscous, non-Newtonian fluid wherein the viscosity of the fluid has a first value, when the viscous fluid's temperature is below the predetermined temperature, that inhibits the flow of the viscous fluid under the influence of a biasing force, and has a second value, when the viscous fluid's temperature is above the predetermined temperature, that permits the controlled flow of the viscous fluid under the influence of the biasing force. Means are provided for defining a flow path for a portion of the viscous fluid. The flow path defining means are adapted to inhibit the flow of the viscous fluid at temperatures below the predetermined temperature, and also for creating a terminal end portion of the viscous fluid therein. Biasing means are provided for urging the viscous fluid within the means for defining its flow path so as to provide the biasing force. Means for viewing the terminal end portion of the viscous fluid, along with means for indicating a relative position of the terminal end portion over a plurality of time intervals are also provided. The indicating means are disposed adjacent to the means for defining a flow path. The indicating means are calibrated so as to indicate the passage of time as a function of the rate of flow of the viscous fluid through the means for defining a flow path. Means for regulating the flow of the viscous fluid are disposed in fluid communication with the means for defining a flow path. The means for regulating are adapted to engage the viscous fluid so as to constrain its flow through the monitor at temperatures above the predetermined temperature.

In one preferred embodiment of the time-temperature monitor the flow path of the viscous, non-Newtonian fluid is defined by a tapered conduit. The viscous fluid is biased within this conduit by a pressurized elastic fluid stored within a chamber that is disposed in sealed fluid communication with the conduit. At least the conduit is provided with a light-transparent portion for viewing a terminal-end portion of the viscous fluid disposed therein. Calibrated indicia may be positioned on the outer surface of the conduit, or on a container that houses the conduit, for indicating intervals of time. In a preferred embodiment, the conduit may be formed from a clear polymer resin.

Preferably, the viscous, non-Newtonian fluid comprises a polydispersed colloidal solution having a viscosity which is a function of the ambient temperature, the geometry of the conduit, and the diameter of an orifice disposed at an end of the conduit that is spaced away from the pressurized chamber. The orifice is adapted to shearingly engage the viscous fluid so as to control the flow of the viscous fluid out of the conduit at temperatures above the predetermined temperature. Advantageously, the viscous fluid exhibits toroidal flow streamlining below the orifice. A fluid receptacle is disposed in fluid communication with the orifice so as to provide a means for collecting the viscous fluid once it has exited the orifice. Absorbing means for absorbing the viscous fluid may be disposed within the receptacle.

In one preferred embodiment, an actuation pin is releasably engaged within the fluid receptacle and orifice prior to operation. The pin extends through, and sealingly engages, the orifice so that when the pin is withdrawn therefrom, the viscous fluid is free to flow through the conduit, out of the orifice, and into the fluid receptacle. The amount of fluid exiting the orifice is determined by the ambient temperature, the biasing force exerted by the pressurized elastic fluid, and the geometry of the tapered conduit and the orifice.

The present invention also comprises a method for monitoring perishable items during storage and/or transit.

BRIEF DESCRIPTION OF THE DRAWINGS

Still other objects and features of the present invention will be more fully disclosed or rendered obvious in the following detailed description of the invention, which is to be considered together with the accompanying drawings wherein like numbers refer to like parts and further wherein.

DETAILED DESCRIPTION OF THE PREFERRED EMBODIMENT

Figure 1:
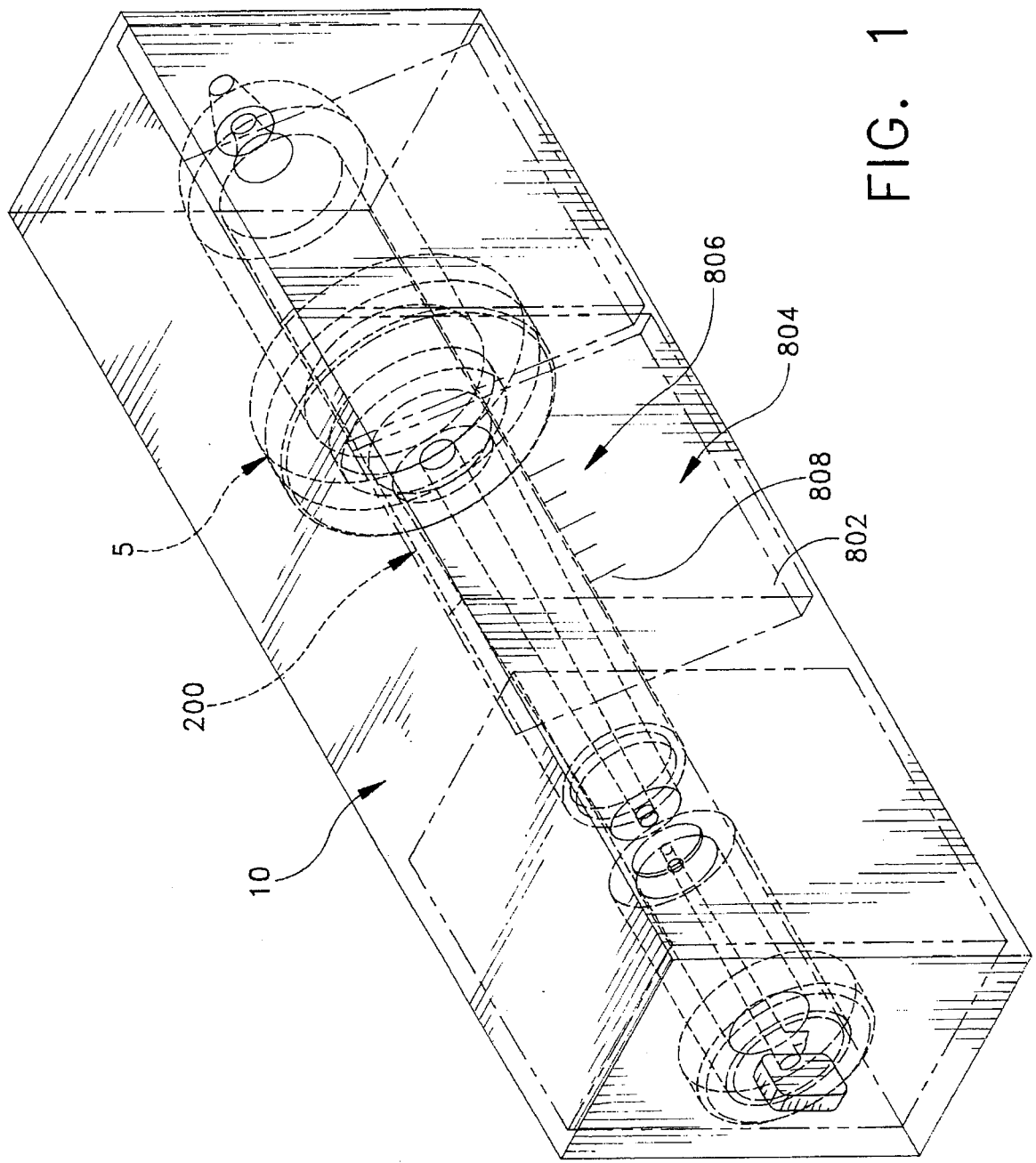
FIG. 1 is a perspective view, partially in phantom, of a time-temperature monitor formed in accordance with the present invention.
Figure 2:
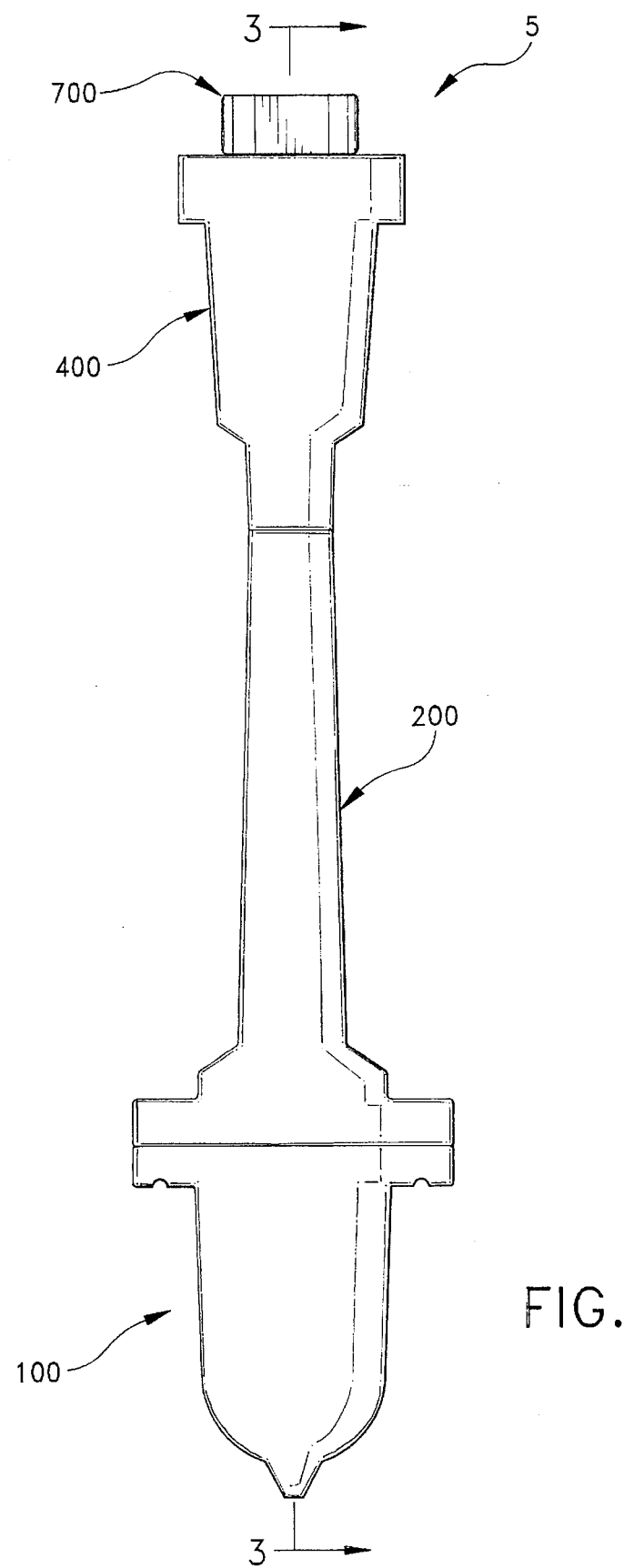
FIG. 2 is a front elevational view of the time-temperature monitor shown in FIG. 1, but with the container removed.
Figure 3:
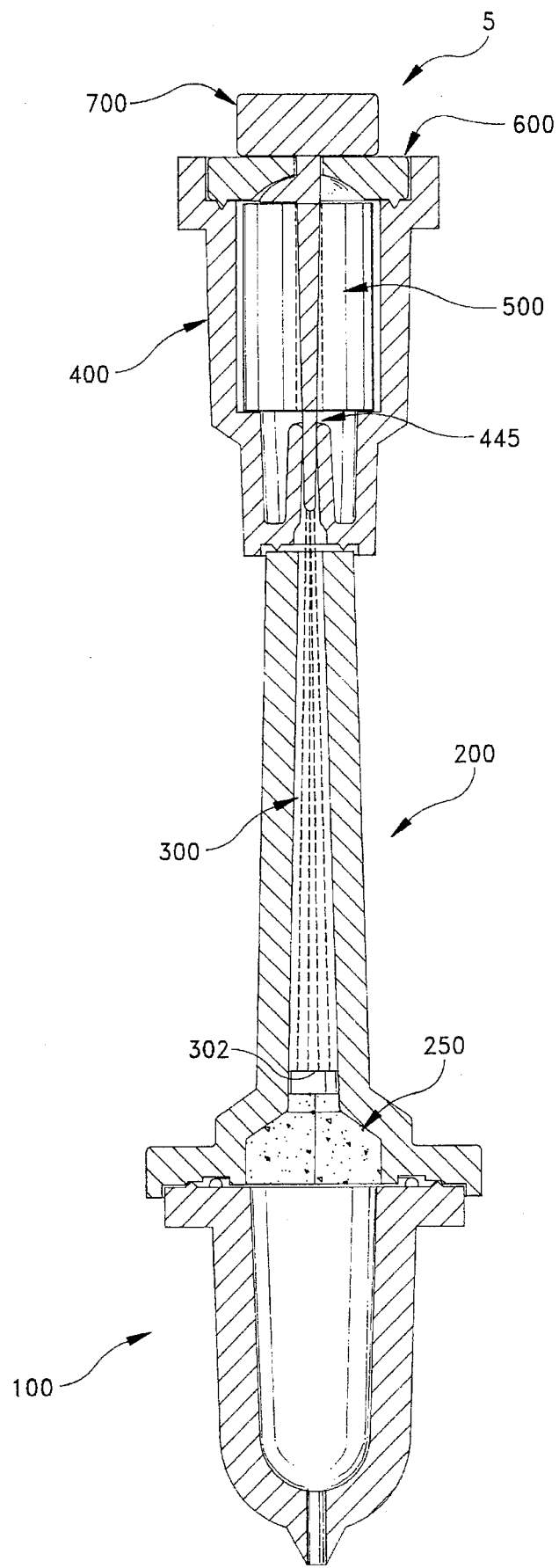
FIG. 3 is a cross-sectional view of the time-temperature monitor, as taken along line 3—3 in FIG. 2.

Referring to FIGS. 1–3, a preferred embodiment of the present invention comprises a time-temperature monitor 5 comprising an elastic fluid reservoir 100, a fluid conduit 200, a barrier 250, a viscous fluid 300, a fluid receptacle 400, an absorbent material 500, an end cap 600, and a pin 700.

Figure 4:
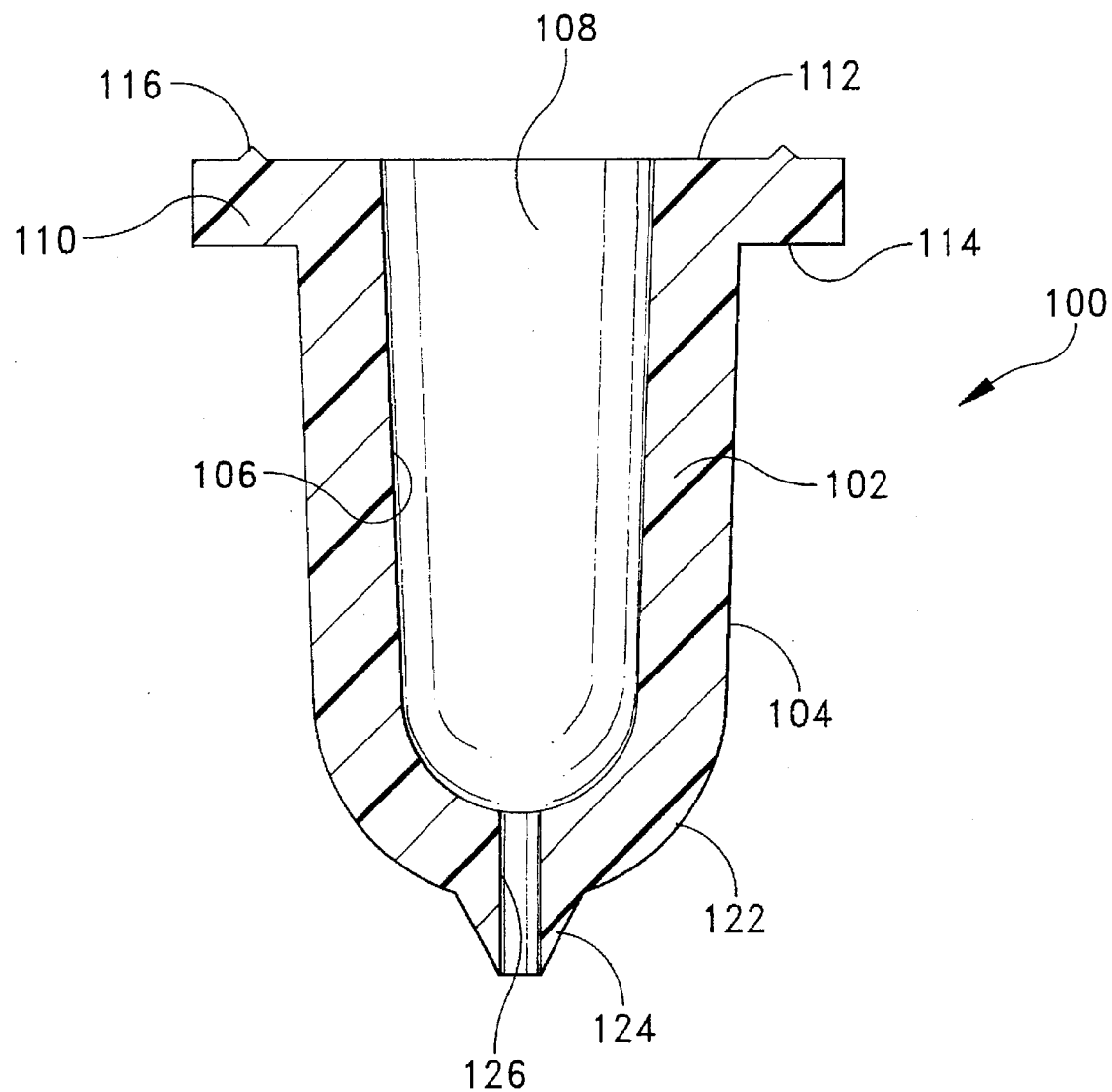
FIG. 4 is a cross-sectional view of the elastic fluid reservoir.

More particularly, and now referring to FIGS. 3 and 4, elastic fluid reservoir 100 comprises a substantially bell-shaped chamber 102 that includes an outer surface 104, an inner surface 106, an open end 108, an annular flange 110, a rounded end wall 122, and a nipple 124. Bell-shaped chamber 102 has a wall thickness sufficient to withstand gas at pressures in the range of from about 1 psi to about 75 psi. Preferably, bell-shaped chamber 102 is formed from a very low gas permeability, clear polymer resin, such as the Barex® polymer manufactured by B P Chemical Corporation.

Annular flange 110 of bell-shaped chamber 102 projects outwardly from outer surface 104, adjacent to open end 108 (FIG. 4). Annular flange 110 has a thickness that is sufficient to obtain a durable, gas tight ultrasonic bond with a corresponding flange on fluid conduit 200, as will hereinafter be disclosed in further detail. Annular flange 110 includes an upper surface 112 and a lower surface 114. Upper surface 112 comprises an ultrasonic energy concentrator in the form of an annular inverted V-shaped projection 116. V-shaped projection 116 projects upwardly from surface 112 so as to engage a corresponding surface on a flange of fluid conduit 200, as will hereinafter be disclosed in further detail. Lower surface 114 is adapted to seat a conventional ultrasonic welding horn (not shown) during assembly of time-temperature monitor 5.

Rounded end wall 122 is disposed in spaced-apart, opposing relation to open end 108 of bell-shaped chamber 102. Nipple 124 projects outwardly from rounded end wall 122. Passageway 126 is disposed within nipple 124, and extends through rounded end wall 122 into the interior of bell shaped chamber 102 so as to be in fluid communication between outer surface 104 and inner surface 106.

Figure 5:
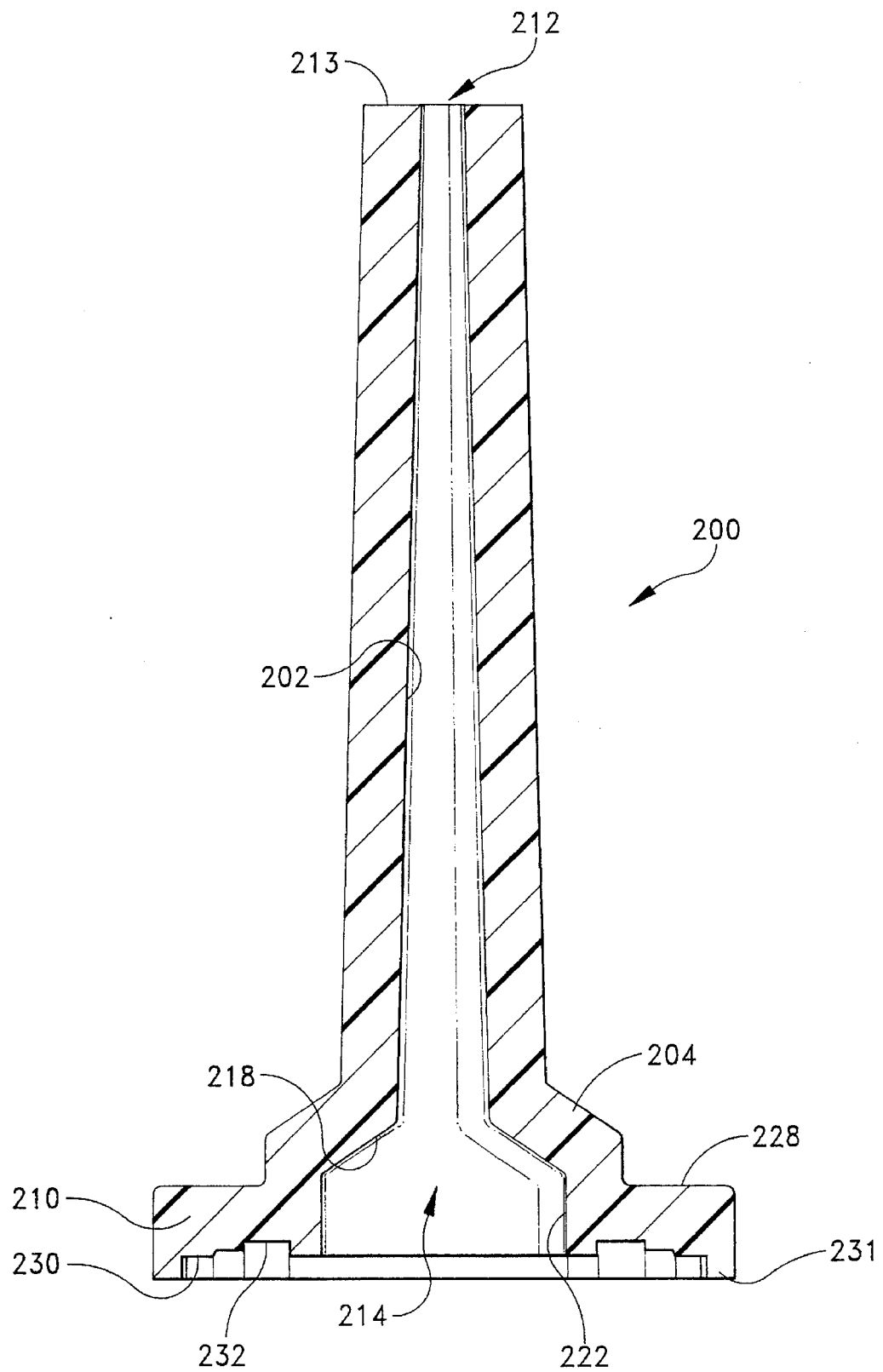
FIG. 5 is a cross-sectional view of the fluid conduit.

Referring now to FIG. 5, fluid conduit 200 comprises a tapered central passageway 202, a tapered flange 204, and an annular flange 210. Fluid conduit 200 is preferably formed from clear polymer resin. Tapered central passageway 202 extends between a relatively small open first end 212 and a relatively large open second end 214. The rate of taper of central passageway 202 will be determined according to the flow characteristics of viscous fluid 300, and the temperature range to be monitored, so as to inhibit the flow of viscous fluid 300 at temperatures below the predetermined reference temperature. More particularly, in one preferred embodiment of the present invention, second end 214 has a diameter in the range of from about 0.105 to about 0.175 inches, with a preferred diameter determined by the reference temperature to be monitored. First open end 212 has a diameter in the range of from about 0.25 to 0.125, with a preferred diameter again being determined by the reference temperature to be monitored. Fluid conduit 200 terminates in an annular end surface 213, adjacent to open first end 212 of passageway 202. End surface 213 is sized to correspond to a receiving portion of fluid receptacle 400, as will hereinafter be disclosed in further detail.

Tapered flange 204 surrounds open second end 214 of tapered passageway 202, and projects outwardly and downwarly therefrom. Open end 214 of tapered flange 204 has a diameter that is substantially the same as the diameter of open end 108 of bell-shaped chamber 102. A cylindrical wall portion 222 extends downwardly from the edge of tapered flange 204, adjacent to open end 214. An inclined inner surface 218 leads inwardly from cylindrical wall portion 222 toward tapered central passageway 202.

Figure 9:
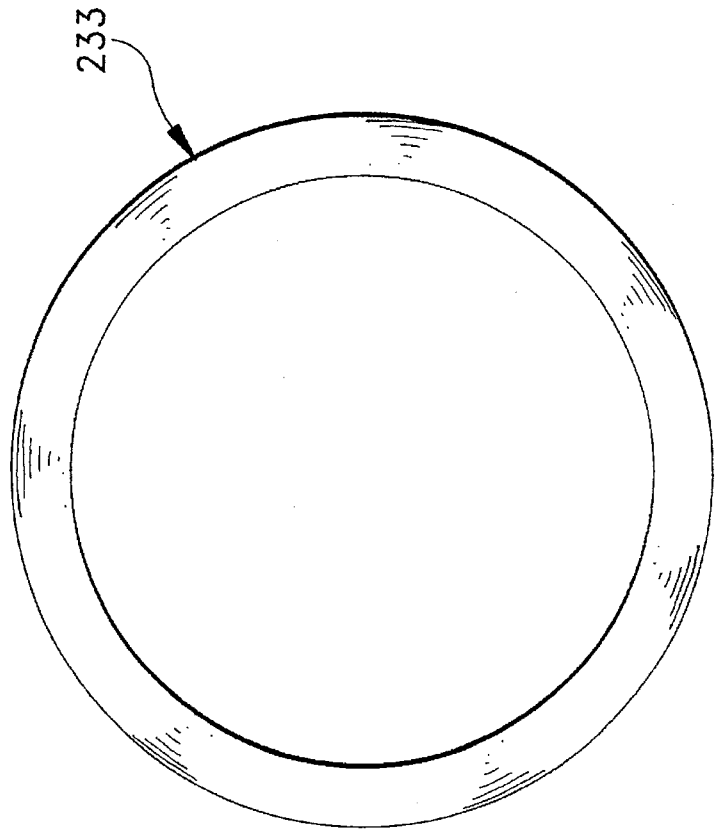
FIG. 9 is a top view of the O-ring seal shown in FIG. 8.
Figure 8:
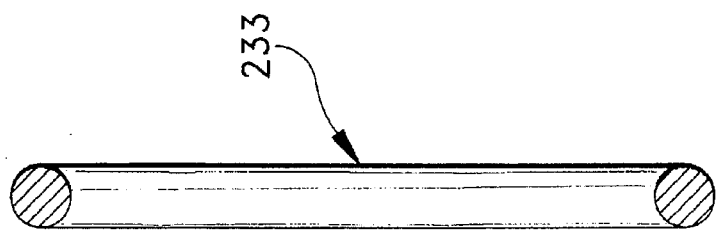
FIG. 8 is a cross-sectional view of the O-ring seal.

Annular flange 210 projects radially outward from cylindrical wall portion 222. Annular flange 210 has a thickness that is sufficient to obtain a durable gas tight ultrasonic bond with corresponding annular flange 110 of bell-shaped chamber 102. Annular flange 210 comprises an upper surface 228, a lower surface 230 and a skirt 231. Upper surface 228 is substantially flat so as to provide a support surface for the ultrasonic welding of fluid conduit 200 to bell-shaped chamber 102. Lower surface 230 includes an annular groove 232 that is adapted to receive a resilient O-ring seal 233 (FIGS. 3, 8 and 9) when fluid conduit 200 is assembled to bell-shaped chamber 102. Skirt 231 projects downwardly from the edge of annular flange 210 so as to guide flange 110 of bell-shaped chamber 102 during assembly, as will hereinafter be disclosed in further detail.

Figure 7:
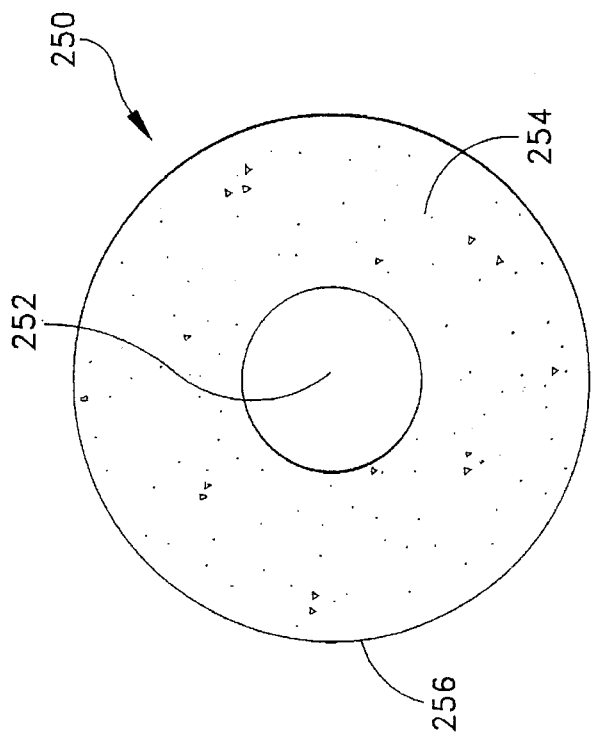
FIG. 7 is a top view of the barrier shown in FIG. 6.
Figure 6:
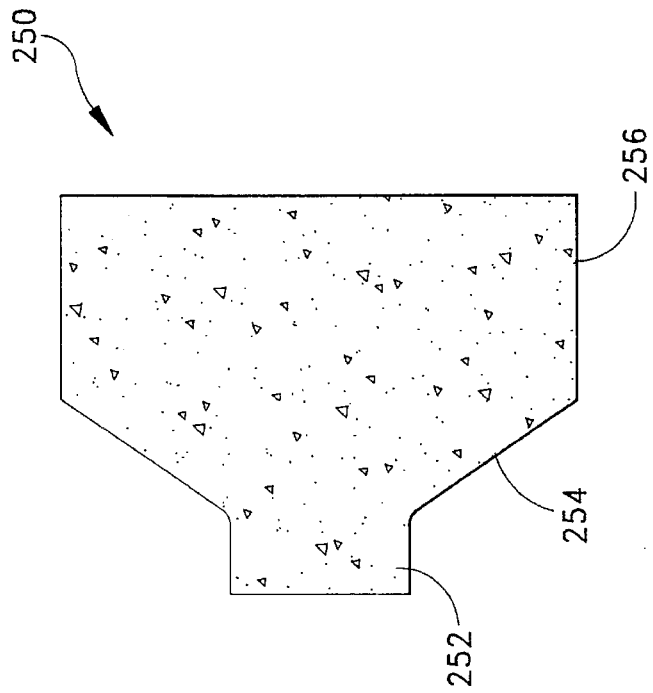
FIG. 6 is a cross-sectional view of the barrier.

Referring now to FIGS. 3, 6 and 7, barrier 250 comprises a shape that corresponds to the interior portion of tapered flange 204. More particularly, barrier 250 includes a first cylindrical portion 252, a frusto-conical portion 254, and a second cylindrical portion 256. First cylindrical portion 252 and frusto-conical portion 254 correspond in shape, but are slightly smaller than, second open end 214 of passageway 202 and inclined inner surface 218 of tapered flange 204, respectively. Second cylindrical portion 256 is sized and shaped to snugly fit within open end 214, adjacent to cylindrical wall portion 222 of tapered flange 204. Barrier 250 comprises a porous material adapted to allow for unimpeded pressurized communication between the elastic fluid in bell-shaped chamber 102 and viscous fluid 300, while at the same time, not allowing viscous fluid 300 to seep into bell-shaped chamber 102 during storage of time-temperature monitor 5. Barrier 250 further acts to remove any moisture that may be carded by the elastic fluid as it biases viscous fluid 300.

In a preferred embodiment of the present invention, viscous fluid 300 generally comprises a polydispersed colloidal polymer solution. Preferably, the polydispersed colloidal polymer solution is a fluid-gel comprising purified water, a water-soluble polymer, a water-miscible organic solvent, an alkali or salt, a freezing point depressing liquid that is miscible in water, and a contrasting agent.

For the purposes of this invention, it is preferred to use water-soluble polymers since this class of fluids generally exhibits non-Newtonian flow characteristics, and therefore viscosities that have an exponential relationship with temperature. It will be understood that with non-Newtonian fluids, more than two phases exist, resulting in a coefficient of viscosity that is not a constant. For non-Newtonian fluids of the type contemplated for use with present invention, the coefficient of viscosity is, advantageously, a function of the rate at which the fluid is sheared, the relative concentration of the phases, and the temperature of the fluid. It will also be understood of course that the viscosity of these fluids is inversely related to their temperatures, i.e., a higher temperature lowers the viscosity and a lower temperature raises the viscosity. As a result of the dependency of the viscosity on shear rate, phase concentration, and temperature, these fluids may be adapted so that small changes in temperature can yield large changes in the fluid's viscosity. Thus, fluids of this type provide a very sensitive, relatively viscous medium that is adaptable for use in connection with the present invention, over a wide range of temperatures.

Water-soluble polymers, also known as "water-soluble resins", "hydrocolloids", and "gums", are well known in the art. By way of example, and not by way of limitation, the following water-soluble polymers are all contemplated for use with the present invention: starch products and natural gums, polyvinyl alcohol, cellulose ethers, ethylene oxide polymers, acrylamide polymers, acrylic acid polymers, polyethylenimine, polyvinylpyrrolidone polymers, as well as other water-soluble polymers. Of course, other materials that exhibit the characteristics of non-Newtonian flow when placed in solution may also be used in connection with the present invention without deviating from its scope. In a preferred embodiment of the present invention, viscous fluid 300 comprises from between about 1% to about 7%, by weight, of water soluble polymer.

More preferably, for best results, it is preferred to use either Hydroxyethyl Cellulose (HEC) or Poly(ethylene oxide) (PEO) as the water-soluble polymer component of viscous fluid 300. More particularly, HEC is a nonionic, water-soluble polymer, generally classified as a modified carbohydrate. HEC is readily soluble in water of varying temperature, and can be used to prepare solutions with a wide range of viscosities. It is important to note that HEC may require the addition of a preservative in order to prevent enzymatic degradation. Various preservatives that are suitable for delaying or preventing such degradation are well known in the art, e.g., Glutaraldehyde manufactured by the Union Carbide Corporation under the tradename designation UCARCIDE®, and are contemplated for use in connection with the present invention.

PEO is also a nonionic, water-soluble polymer, generally classified as a polyether. PEO will hydrogen bond with water, at temperatures just below the boiling point, thus rendering PEO very soluble in water. Presently, the best results are obtained by using the HEC or PEO manufactured and sold by Union Carbide Corporation, Specialty Chemicals Division, under the trademark designations Cellosize® (HEC) and Polyox® (PEO).

Various Of the known water-miscible organic solvents, in which water-soluble polymers are not soluble, may be used in connection with the practice of the present invention. In the present invention, these compounds may serve as both a freezing point depressing agent and as a resin separating agent.

More particularly, by varying the concentration of the water-miscible organic solvents in the polymer solution, the freezing point of the purified water can be depressed to different, but predictable levels. Thus formulations of viscous fluid 300 that are suitable for use at a relatively higher temperature may contain very little (by Nt. % weight), if any, of the water-miscible organic solvents. When higher temperature environments are to be monitored, the concentration of the water soluble polymer and the salt or alkali content will control the viscosity and fluid flow behavior of viscous fluid 300. Alternatively, formulations of viscous fluid 300 that are suitable for use at relatively lower temperatures may contain more significant amounts (by Nt. % weight) of the water-miscible organic solvents. In this way, the temperature range that may be monitored by the present invention may be adjusted upwardly or downwardly, according to the application.

The water-miscible solvent also acts to separate the individual resin particles from each other so as to avoid clumping and coiling of the polymer molecules. The water-miscible solvent may also be advantageously used to carry a contrasting agent, such as one of the common food coloring dyes, so as to provide for enhanced visibility of viscous fluid 300 within fluid conduit 200 during the operation of the time-temperature monitor 5.

By way of example, and not by way of limitation, various of the known water-miscible solvents may be used to practice the present invention, such as anhydrous ethanol, 2-propanol, ethylene glycol, propylene glycol, glycerin, acetone, etc. In a preferred embodiment of the present invention, propylene glycol (1,2-Propanediol, 99.5% assay) manufactured by Alfa Chemicals Division of Johnson Matthey, may be used as both the water-miscible solvent and freezing point depressing agent. In a preferred embodiment of the present invention, viscous fluid 300 comprises from between about 0% to about 60%, by weight, of water-miscible solvent.

Salt or alkali solutions are added to viscous fluid 300 so as to decrease the solubility of the water-soluble polymers. In practice, the water-soluble polymer will be mixed with a salt or alkali solution prior to the addition of water. Dissolution of the water-soluble polymer generally occurs upon dilution of the water-soluble polymer/salt or alkali slurry with the purified water. Preferably, sodium hydroxide or sodium chloride may be used with good results.

Figure 10:
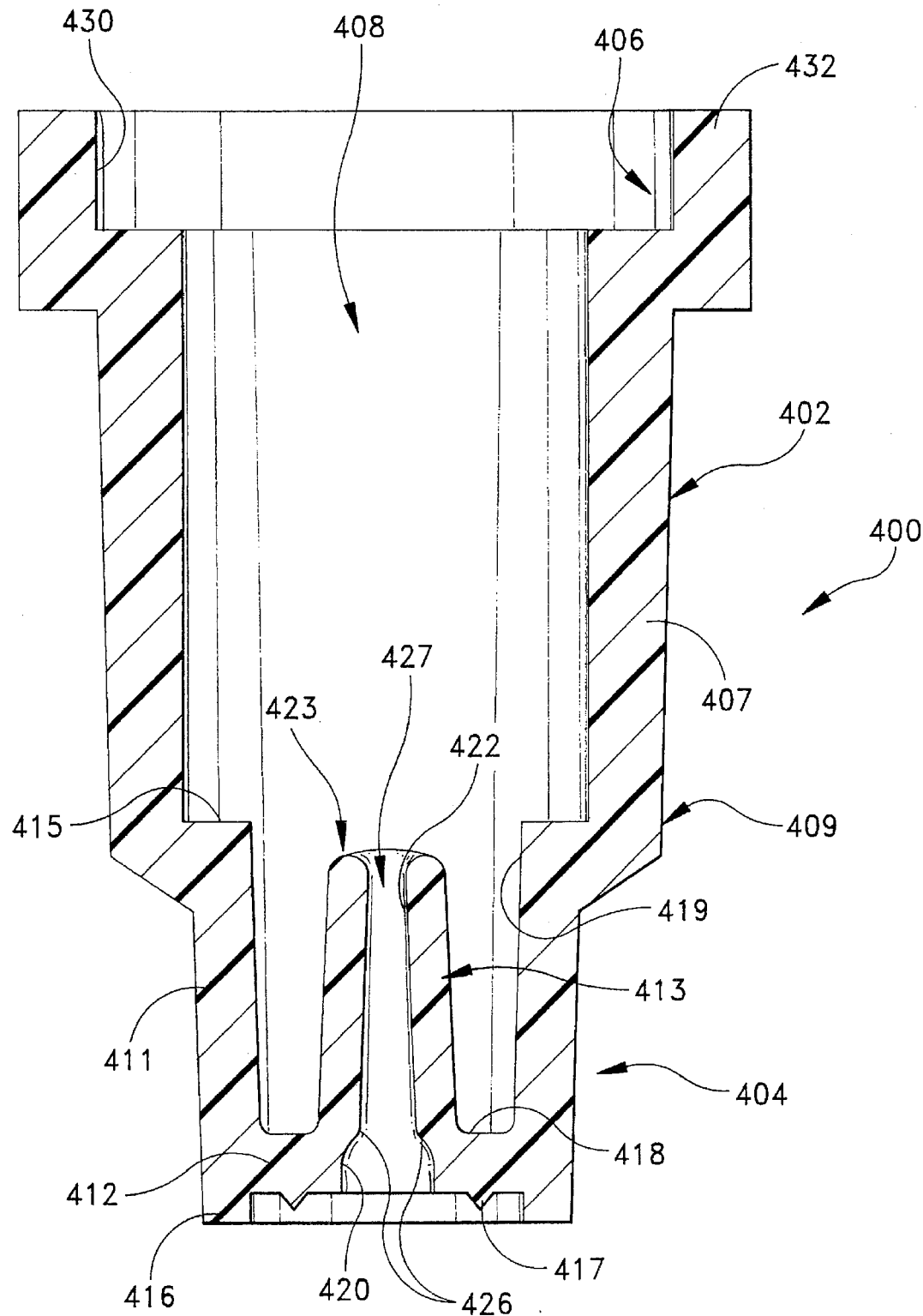
FIG. 10 is a cross-sectional view of one preferred embodiment of the fluid receptacle.

Referring now to FIG. 10, fluid receptacle 400 comprises a chamber 402, a conduit engaging portion 404, and a cap receiving portion 406. More particularly, chamber 402 comprises a substantially cylindrically-shaped wall 407 having an open upper end 408 and a lower end 409. Chamber 402 is sized and shaped so as to accept absorbent material 500.

Conduit engaging portion 404 is also cylindrically-shaped, but with a relatively smaller diameter relative to chamber 402. Conduit engaging portion 404 projects downwadly from lower end 409 of chamber 402, and comprises an outer wall 411, a base 412, and a nozzle 413. Conduit engaging portion 404 defines an annular internal shoulder 415 at the intersection of lower end 409 of chamber 402 and the top of outer wall 411. Outer wall 411 also projects downwardly, below base 412, so as to form an annular skirt 416 that is adapted to guide open first end 212 of fluid conduit 200 during assembly. An annular V-shaped energy concentrator 417 projects downwardly from the bottom of base 412 so as to enhance ultrasonic welding of fluid receptacle 400 to end surface 213 of fluid conduit 200 during assembly. An annular recess 419 is defined between nozzle 413 and outer wall 411. Annular recess 419 is sized and shaped so as to receive an ultrasonic welding horn when base 412 is fastened to end surface 213 of fluid conduit 200, as will hereinafter be disclosed in further detail. Additionally, recess 419 is further adapted to collect an initial portion of viscous fluid 300 upon actuation of time-temperature monitor 5.

Nozzle 413 is centrally disposed on inner surface 418 of base 412 so as to project inwardly therefrom, toward the interior of chamber 402. A free end 423 of nozzle 413 is advantageously disposed below shoulder 415 so as to prevent capillary action from occurring as viscous fluid 300 rises above free end 423 and comes into contact with the surrounding surfaces. Nozzle 413 comprises a central passageway having a first diameter portion 420 and a second diameter portion 422. First diameter portion 420 is relatively larger than second diameter portion 422, with a narrowed or constricted orifice 426 disposed at the intersection of first diameter portion 420 and second diameter portion 422. First diameter portion 420 is sized and shaped so as to correspond to the size and shape of passageway 202 at first open end 212 of fluid conduit 200.

Second diameter portion 422 extends upwardly from orifice 426 to an opening 427 disposed at free end 423. Orifice 426 has a diameter that is selected so as to regulate the flow of viscous fluid 300 into fluid receptacle 400. In a preferred embodiment of the present invention, orifice 426 has a diameter in the range of from about 0.025 to about 0.125 inches, depending upon the composition of viscous fluid 300 and the reference temperature to be monitored. The diameter of orifice 426 is selected so as to apply a constant shearing force to viscous fluid 300, and thereby cause viscous fluid 300 to exhibit toroidal flow characteristics just below orifice 426.

Figure 17:
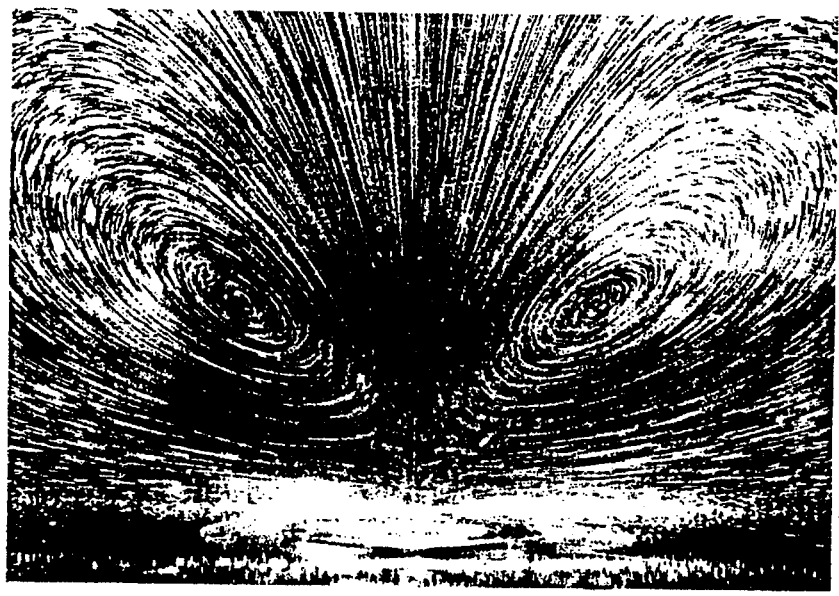
FIG. 17 is a depiction of the streamlines formed by a non-Newtonian fluid exiting a constricting orifice.
Figure 18:
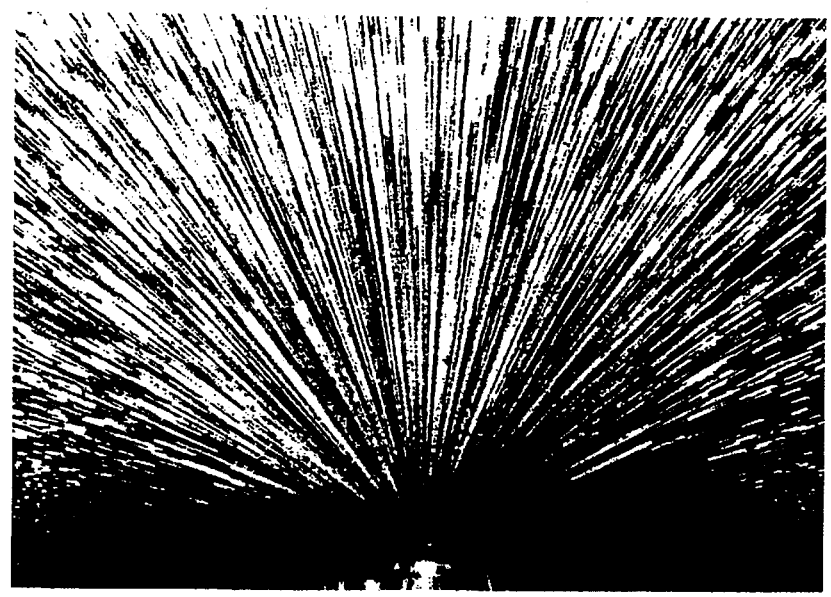
FIG. 18 is a depiction of the streamlines formed by a Newtonian fluid exiting a constricting orifice.

More particularly, and now referring to FIGS. 3, 10, 17 and 18, the constant shearing force applied by orifice 426 to viscous fluid 300, as viscous fluid 300 enters relatively small diameter orifice 426 from the relatively large diameter portion 420, will cause viscous fluid 300 to exhibit a large toroidal vortex streamline just below orifice 426. An example of a toroidal vortex streamline is depicted in FIG. 17. The presence of this relatively large toroidal vortex below orifice 426 acts to constrain and regulate the rate of flow of viscous fluid 300 through fluid conduit 200 and nozzle 413.

In particular, the lengthy water soluble polymer molecules are in a relatively tangled arrangement, relative to one another, as they approach orifice 426 from open end 212 of central passageway 202. As a consequence, only water soluble polymer molecules that are oriented so as to be in a substantially parallel, coaxial relation with orifice 426 will be able to pass therethrough. Those water soluble polymer molecule that reach orifice 426 in a substantially non-parallel, non-coaxial state will be swept aside, into the toroidal vortex that is created below orifice 426. As each molecule disentangles from its surrounding neighbors, and aligns itself in a substantially parallel, coaxial relation with orifice 426, it will in turn pass through orifice 426 and exit nozzle 413. As a result, viscous fluid 300 will flow from nozzle 413 at a prolonged and controlled rate. It is the molecule orientation selection effect associated with orifice 426 and the toroidal vortex created within first diameter portion 420 that provides for multiple hours of operation in the present invention. A Newtonian fluid, by way of contrast, would enter orifice 426 exhibiting straight streamline flow characteristics (see, for example, FIG. 18). As a result, a Newtonian fluid, under the biasing influence of the pressurized elastic fluid in bell-shaped chamber 102, would exit fluid conduit 200 in a matter of minutes.

Still referring to FIG. 10, cap receiving portion 406 comprises an annular shoulder 430 and an annular vertical end wall 432. Annular shoulder 430 is defined by the intersection of the top of chamber wall 407 and annular vertical end wall 432. Together, annular shoulder 430 and annular vertical end wall 432 form a seat adjacent to open upper end 408 that is adapted to receive end cap 600, as will hereinafter be disclosed in further detail.

Figure 11:
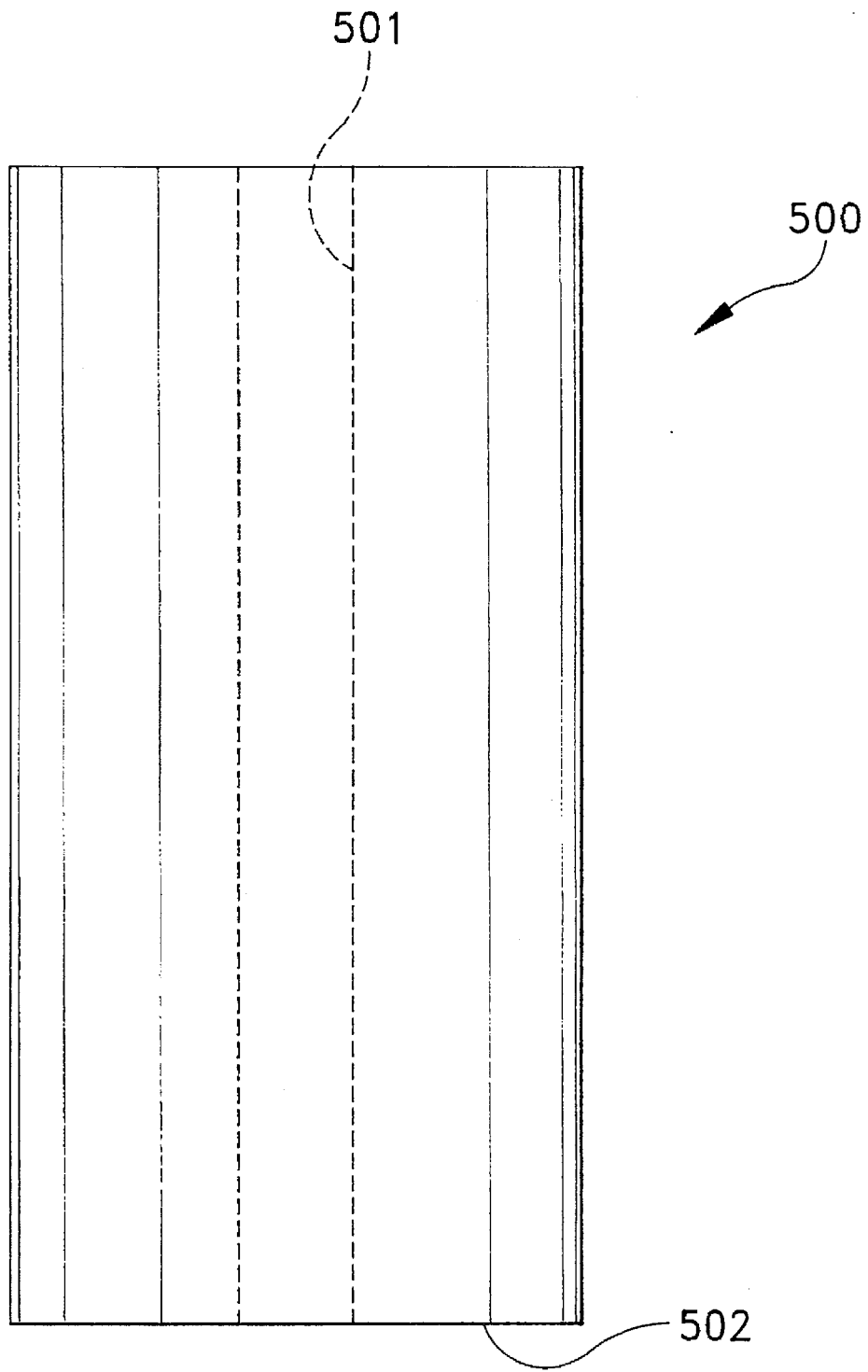
FIG. 11 is a cross-sectional view of the absorbent material.

Referring now to FIG. 11, absorbent material 500 comprises a substantially cylindrical piece of absorbent material having a central passageway 501 and a bottom end 502. Absorbent material 500 is sized and shaped so as to be capable of absorbing the total amount of viscous fluid 300 that exits nozzle 413. Absorbent material 500 is chosen from the group of materials that may absorb viscous fluid 300 at a predetermined rate. For example, cellulose acetate manufactured by American Filtrona Company under reference No.: R-1674 is a suitable material. Of course, other materials may be equally well suited and are therefore considered within the scope of the present invention. Significantly, in the preferred embodiment of the present invention, viscous fluid 300 comprises a contrasting agent, such as common food coloring or the like, that will stain absorbent material 500 as viscous fluid 300 is forced into chamber 402. In this way, the user will be able to detect that time-temperature monitor 5 is activated.

Figure 13:
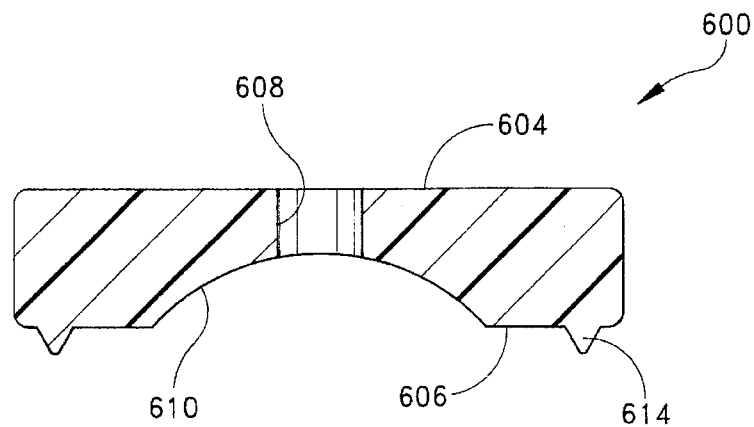
FIG. 13 is a cross-sectional view of the cap, as taken along line 13—13 in FIG. 12.
Figure 12:
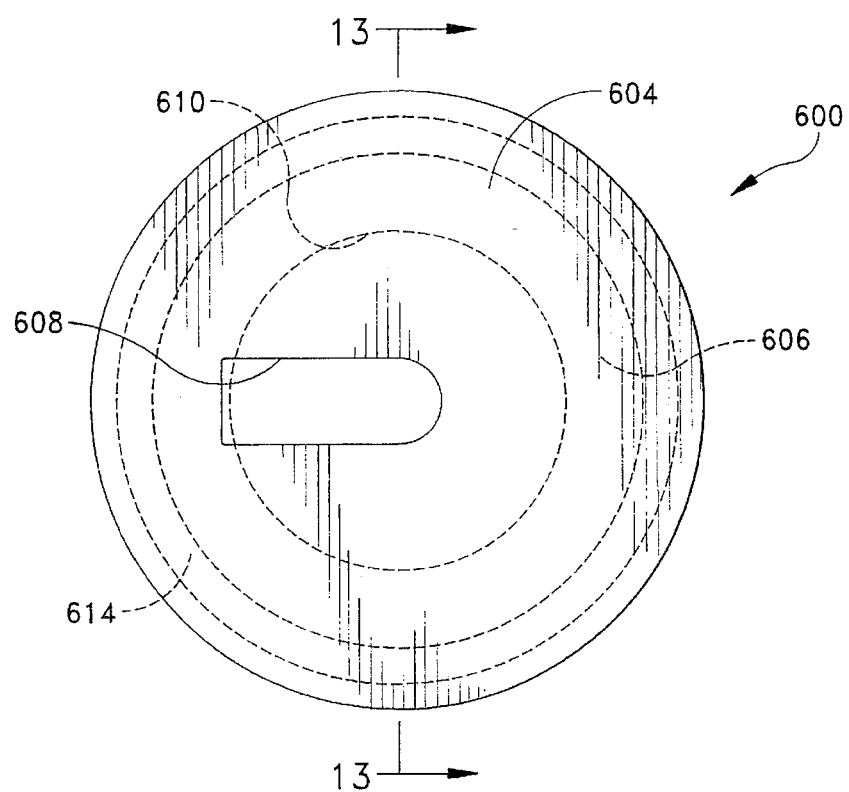
FIG. 12 is a top elevational view of the cap, showing the bottom surface features in phantom.

Referring now to FIGS. 12 and 13, end cap 600 comprises an upper surface 604, a lower surface 606, and a radial slot 608. End cap 600 is sized and shaped so as to be snugly seated on annular shoulder 430 and adjacent to vertical end wall 432 of fluid receptacle 400. Lower surface 606 further includes a central depression 610 and an annular ultrasonic energy concentrator 614.

More particularly, central depression 610 comprises a concave curvature chosen so as to match the curvature of a corresponding locking projection on pin 700, as will hereinafter be disclosed in further detail. Annular ultrasonic energy concentrator 614 is disposed between central depression 610 and the edge of end cap 600. Ultrasonic energy concentrator 614 is substantially identical in function to annular inverted V-shaped projection 116 disclosed hereinabove in connection with bell-shaped chamber 102. Radial slot 608 extends radially-outward from the center of end cap 600 so as to form a void space between upper surface 604, lower surface 606, and depression 610.

Figure 15:
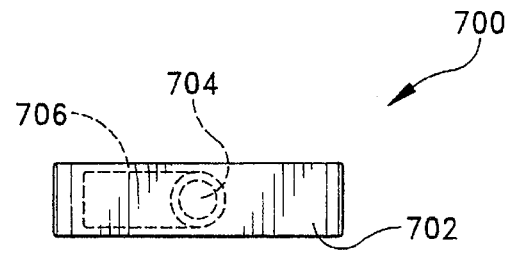
FIG. 15 is a top view of the pin, showing the locking projection and tapered shaft in phantom.
Figure 14:
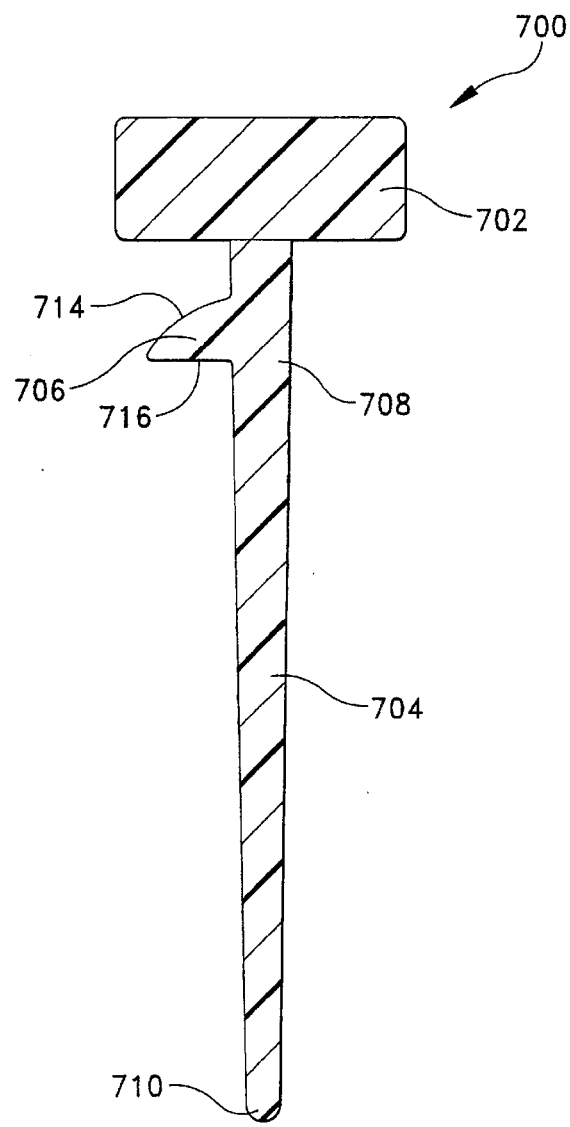
FIG. 14 is a cross-sectional view of the pin.

Referring now to FIGS. 14 and 15, pin 700 comprises a handle 702, a shaft 704, and a locking projection 706. More particularly, and now referring to FIG. 14, handle 702 has a substantially rectangular shape adapted to be firmly gripped so as to allow both rotation and insertion/extraction of pin 700 relative to cap 600. Shaft 704 extends downwardly from handle 702, and is tapered from its widest section at proximal portion 708 to its narrowest section at its distal end 710. Proximal portion 708 is sized so as to fit snugly within an upper portion of central passageway 501 of absorbent material 500. Shaft 704 is also long enough so that distal end 710 extends into nozzle 413 when pin 700 is fully disposed within time-temperature monitor 5. Distal end 710 is sized and shaped so as to correspond to orifice 426 of nozzle 413. As a result of this construction, distal end 710 may be sealingly received within orifice 426 so as to prevent viscous fluid 300 from entering chamber 402 prior to the activation of the monitor.

Locking projection 706 projects outwardly from proximal portion 708 of tapered shaft 704, but does not extend beyond the edge of handle 702 (FIG. 14). Locking projection 706 comprises a curved upper surface 714 and a flat lower surface 716. The curvature of upper surface 714 corresponds to the curvature of central depression 610 in end cap 600. Locking projection 706 has a width that corresponds to the thickness of tapered shaft 704 at proximal portion 708 (FIG. 15).

In a preferred embodiment of the present invention, time-temperature monitor 5 is housed within a container 10 so as to protect it, and maintain it in position near to the goods to be monitored. Referring once more to FIG. 1, container 10 comprises a rectangular box formed from a suitable material such as card board, plastic, or the like, and comprises a V-shaped recess 802, a window 804 and graduated indicia 806. V-shaped recess 802 is disposed within container 10 so as to cradle time-temperature monitor 5 along fluid conduit 200. Window 804 extends along a side portion of container 10, opposite V-shaped recess 802, for at least a portion of the length of fluid conduit 200. In this way, the terminal end portion 302 (FIG. 3) of viscous fluid 300 may be observed therethrough as it changes position in response to increases in ambient temperature above the predetermined reference temperature. Graduated indicia 806 are disposed either adjacent to window 804 on surface 808 of V-shaped recess 802 or on window 804 itself. Graduated indicia 806 are calibrated so as to indicate the passage of time when viewed relative to succeeding positions of terminal end portion 302 of viscous fluid 300.

Figure 16:
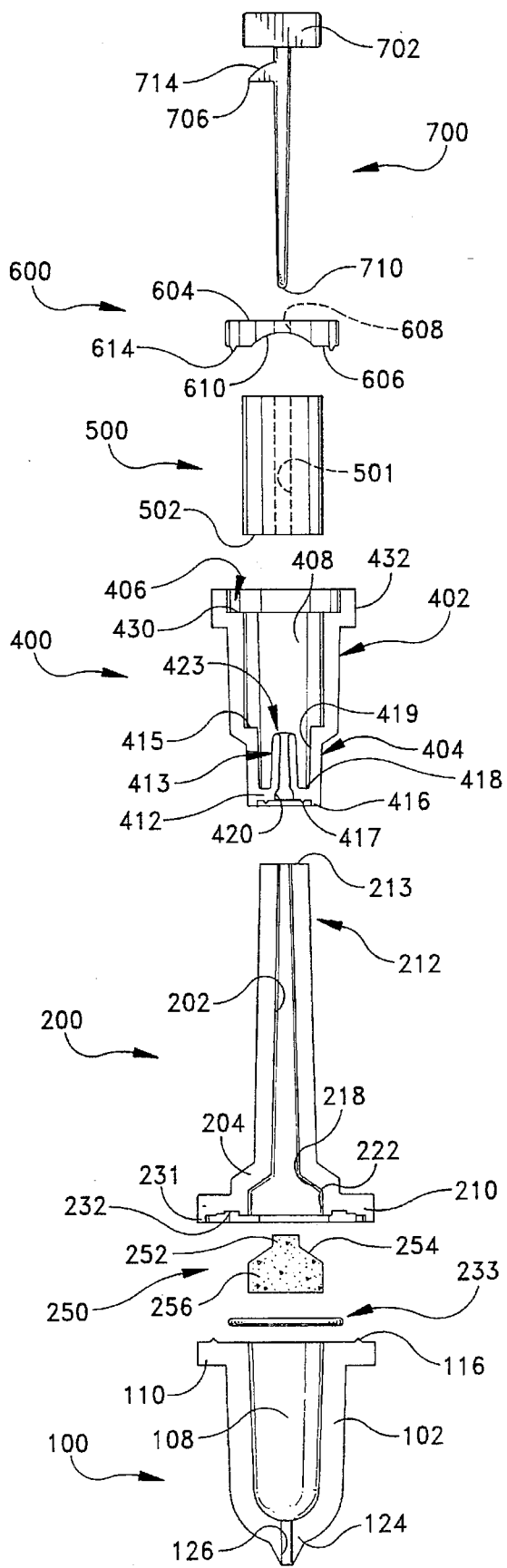
FIG. 16 is an exploded view of the time-temperature monitor shown in FIG. 2.

A time-temperature monitor 5 may be formed according to the present invention in the following manner. Referring now to FIG. 16, fluid receptacle 400 is first fastened to fluid conduit 200. More particularly, fluid receptacle 400 is oriented so that the bottom surface of base 412 of conduit engaging portion 404 is positioned in opposing, aligned relation with end surface 213 of fluid conduit 200. In this arrangement, first diameter portion 420 of the central passageway of nozzle 413 is coaxially aligned with central passageway 202 of fluid conduit 200. From this position, fluid receptacle 400 and fluid conduit 200 are moved toward each other so that annular skirt 416 of fluid receptacle 400 slidingly engages the outer surface of first open end 212 of fluid conduit 200. At the same time, ultrasonic energy concentrator 417 engages end surface 213. Once in this position, fluid receptacle 400 and fluid conduit 200 are ultrasonically welded together by inserting a portion of an ultrasonic welding device through chamber 402 and into recess 419 so as to place it against inner surface 418 of base 412, and then actuating the welding device.

Next, absorbent material 500 is placed within chamber 402. More particularly, absorbent material 500 is oriented so that end 502 enters chamber 402 first. Once in this position, absorbent material 500 is slid into chamber 402 until end 502 contacts shoulder 415. In this way, a space 445 (FIG. 3)

is provided between free end 423 of nozzle 413 and end 502 of absorbent material 500. As a result of this construction, sufficient space is provided above free end 423 for viscous fluid 300 to exit nozzle 413 and enter chamber 402, without the occurrence of capillary action.

With absorbent material 500 in place within fluid receptacle 400, end cap 600 is assembled to fluid receptacle 400. More particularly, end cap 600 is oriented so that its lower surface 606 is disposed in opposing relation to open end 408, and in aligned-relation with cap receiving portion 406, of fluid receptacle 400. End cap 600 is then moved toward cap receiving portion 406 until energy concentrator 614 contacts annular shoulder 430. In this position, the peripheral edge of end cap 600 is in contacting engagement with the inner surface of vertical end wall 432. Once seated within cap receiving portion 406, end cap 600 may be ultrasonically welded to fluid receptacle 400. In this way, absorbent material 500 is sealingly captured within chamber 402.

Next, pin 700 is inserted through radial slot 608 of end cap 600 in order to seal-off fluid receptacle 400. More particularly, distal end 710 is inserted into fluid receptacle 400 via the center of radial slot 608. It is important to note that locking projection 706 must be oriented so as to be in alignment with radial slot 608. As a result of this construction, pin 700 may be passed through radial slot 608 so as to enter absorbent material 500, via central passageway 501. Pin 700 is then moved toward free end 423 of nozzle 413 until handle 702 contacts upper surface 604 of end cap 600, and distal end 710 enters orifice 426. Once in this position, handle 702 is twisted so as to move curved upper surface 714 of locking projection 706 into sliding engagement with correspondingly curved depression 610. Thus in this arrangement, pin 700 is locked within fluid receptacle 400, and central passageway 202 of fluid conduit 200 is sealed at its first open end 212, via distal end 710 of pin 700.

Once assembled to this point, the entire subassembly is rotated so that tapered flange 204 is disposed above fluid receptacle 400. In this position, open end 214 of fluid conduit 200 points upwardly relative to the rest of fluid conduit 200. Viscous fluid 300 is then back filled into central passageway 202 of fluid conduit 200.

More particularly, viscous fluid 300 is first drawn into a syringe or the like, having a dispensing cannula that is long enough to extend through central passageway 202 and into first diameter section 420 of nozzle 413, adjacent to distal end 710 of pin 700. Once in this position, viscous fluid 300 is forced out of the dispensing cannula and into first diameter section 420 and thereafter into central passageway 202 of fluid conduit 200. It is important to note that viscous fluid 300 is prevented from exiting nozzle 413 at this point by distal end 710 of pin 700. In this way, fluid conduit 200 is charged with viscous fluid 300. It is also important to note that central passageway 202 is filled with viscous fluid 300 up to, but not exceeding second open end 214, thus forming terminal end portion 302 within second open end 214. In a preferred embodiment, viscous fluid 300 does not reside on inclined inner surface 218 of tapered flange 204.

Next, barrier 250 is inserted into tapered flange 204. More particularly, first cylindrical portion 252 is oriented so as to be in aligned coaxial relation with second open end 214 of passageway 202. From this position, barrier 250 is lowered into tapered flange 204 until frusto-conical portion 254 engages inclined inner surface 218 of tapered flange 204 and the outer surface of second cylindrical portion 256 is seated snugly adjacent to the inner surface of cylindrical wall portion 222.

Once fluid conduit 200 is fully charged with viscous fluid 300 and barrier 250 is in place within tapered flange 204, bell-shaped chamber 102 may be assembled to fluid conduit 200. More particularly, O-ring seal 233 is positioned in annular groove 232 of fluid conduit 200. Next, bell-shaped chamber 102 is oriented so that its open end 108 is disposed in opposing relation to open end 214 of fluid conduit 200 and the bottom surface of barrier 250. Bell-shaped chamber 102 is then moved toward fluid conduit 200 until V-shaped projection 116 engages lower surface 230 of annular flange 210, and O-ring seal 233 is compressed between annular groove 232 and upper surface 112. Annular skirt 231 slidingly engages the outer surface of flange 110 so as to help align fluid conduit 200 with bell-shaped chamber 102. Once in this position, bell-shaped chamber 102 may be ultrasonically welded to fluid conduit 200.

To complete the assembly, bell-shaped chamber 102 is pressurized with an elastic fluid. In this process, nipple 124 is engaged by a pressure nozzle associated with an ultrasonic welding head of the type that is well known in the art. The pressure nozzle makes a gas tight seal with nipple 124 so as to be in fluid communication with passageway 126. Once in this position, chamber 102 is first evacuated, and then pressurized gas is let into the interior of bell-shaped chamber 102 until the pressure therein reaches approximately 8–10 psi. Various inert or low reactivity gases and/or fluids are contemplated for use in connection with the present invention including, compressed air, $N_2$, Chlorofluorocarbons or their equivalents, etc. It should be understood that the value of the pressure will be determined by the composition of viscous fluid 300, the temperature range to be monitored, the rate of taper of fluid conduit central passageway 202, and the size and shape of orifice 426. Once bell-shaped chamber 102 is fully pressurized, nipple 124 is sealed by ultrasonically welding it closed. Bell-shaped chamber 102 may now be placed within container 10 so that fluid conduit 200 is visible through window 804.

Of course it will be understood that, when time-temperature monitor 5 is fully assembled, the pressurized elastic fluid and viscous fluid 300 will be in stasis. In particular, the pressure exerted by the pressurized elastic fluid against terminal end portion 302 of viscous fluid 300 will be exactly balanced by the action of distal end 710 of pin 700 on the opposite end of viscous fluid 300.

Time-temperature monitor 5 must first be conditioned before it is capable of monitoring the temperature excursions associated with a perishable item. More particularly, a time-temperature monitor 5, assembled according to the procedure disclosed hereinabove, is placed in an ambient environment having a temperature at or below the critical temperature to be monitored. Typically, time-temperature monitor 5 will remain in this conditioning environment for between 1 to 5 hours, or for a time sufficient to establish thermal equilibrium, depending on the composition of viscous fluid 300. Once the temperature of time-temperature monitor 5 has been lowered to the temperature of the conditioning environment, it is ready to be activated and deployed in or near to a perishable goods container.

More particularly, to activate time-temperature monitor 5, handle 702 of pin 700 is first twisted until locking projection 706 is aligned with radial slot 608 of cap 600. Pin 700 is then pulled from time-temperature monitor 5 and container 10 and discarded. As this occurs, the pressurized elastic fluid disposed within bell-shaped chamber 102 urges the terminal end portion 302 of viscous fluid 300 upwardly through fluid conduit 200. At the same time, a portion of viscous fluid 300 may pass through orifice 426 and out of nozzle 413.

However, since viscous fluid 300 is at or near the conditioning temperature, its viscosity is sufficiently high enough to prevent it from completely flowing out of passageway 202. As a result, viscous fluid 300 will again reach an equilibrium state, by exerting a balancing force against the pressurized elastic fluid that is sufficient to maintain the viscous fluid's position within fluid conduit 200, with terminal end portion 302 being located at its starting position relative to graduated indicia 806. The balancing force that is achieved will be determined by the viscosity of viscous fluid 300 at the conditioning temperature, the rate of taper of passageway 200, and the diameter orifice 426.

Once time-temperature monitor 5 has been activated it is ready to monitor perishable goods. Time-temperature monitor 5 may be placed within a box or crate containing the perishable goods or within the shipping compartment of a airplane, truck, train, or other transporting means. When the ambient temperature surrounding the perishable goods, and hence time-temperature monitor 5, exceeds a predetermined reference temperature, the viscosity of viscous fluid 300 will be lowered sufficiently to allow it to flow, at a controlled rate, through passageway 202 and into fluid receptacle 400. In particular, at temperatures above the predetermined reference temperature, the flow of viscous fluid 300 will only be regulated by the sorting effect of the toroidal vortex streamlines that are created within first diameter portion 420 of nozzle 413, below orifice 426. If the ambient temperature falls below the reference temperature again, the viscosity of viscous fluid 300 will once again increase, and viscous fluid 300 will cease to flow.

Each time the ambient the temperature increases above the reference temperature, viscous fluid 300 will once again flow, and terminal end portion 302 will move further from its starting position relative to graduated indicia 806. By simply noting the starting position of terminal end portion 302, relative to graduated indicia 806, and then its final position, it is possible to determine the total amount of time that the monitor, and hence the perishable goods, have been exposed to temperatures above the predetermined reference temperature.

By way of example, a time-temperature monitor formed and conditioned according to the present invention, may be adapted for monitoring perishable goods having a critical temperature of about 32° F. (0° C.) in the following way. A monitor is formed according to the above-disclosed procedure comprising a fluid conduit having a central passageway that tapers from about 0.200 inches at its widest end to about 0.100 inches at its narrowest end. The orifice used in connection with this monitor comprises a diameter of approximately 0.050 inches. The gas reservoir will have been pressurized to about 7 psi in this case. The monitor is charged with approximately 2-3 grams of viscous fluid comprising approximately 93% nt. weight of pure water, 5% nt. weight of hydroxyethyl cellulose, 2-3% nt. weight of propylene glycol, 0% nt. weight of sodium chloride, and 0.5% nt. weight of blue food coloring dye. Once this monitor has been fully assembled, it is conditioned according to the above-disclosed procedure for approximately 240 minutes prior to actuation and use.

In a further example, a time-temperature monitor formed and conditioned according to the present invention, may be adapted for monitoring perishable goods having a critical temperature of about 40° F. (4.5° C.) in the following way. A monitor is again formed according to the above-disclosed procedure comprising a fluid conduit having a central passageway that tapers from about 0.200 inches at its widest end to about 0.100 inches at its narrowest end. The orifice used in connection with this monitor comprises a diameter of approximately 0.060 inches. The gas reservoir will have been pressurized to about 5 psi in this case. The monitor is charged with approximately 2-3 grams of viscous fluid comprising approximately 92% nt. weight of pure water, 6% nt. weight of hydroxyethyl cellulose, 0.5% nt. weight of propylene glycol, 1% nt. weight of sodium chloride, and 0.5% nt. weight of blue food coloring dye. Once this monitor has been fully assembled, it is conditioned according to the above-disclosed procedure for approximately 180 minutes prior to actuation and use.

Figure 19:
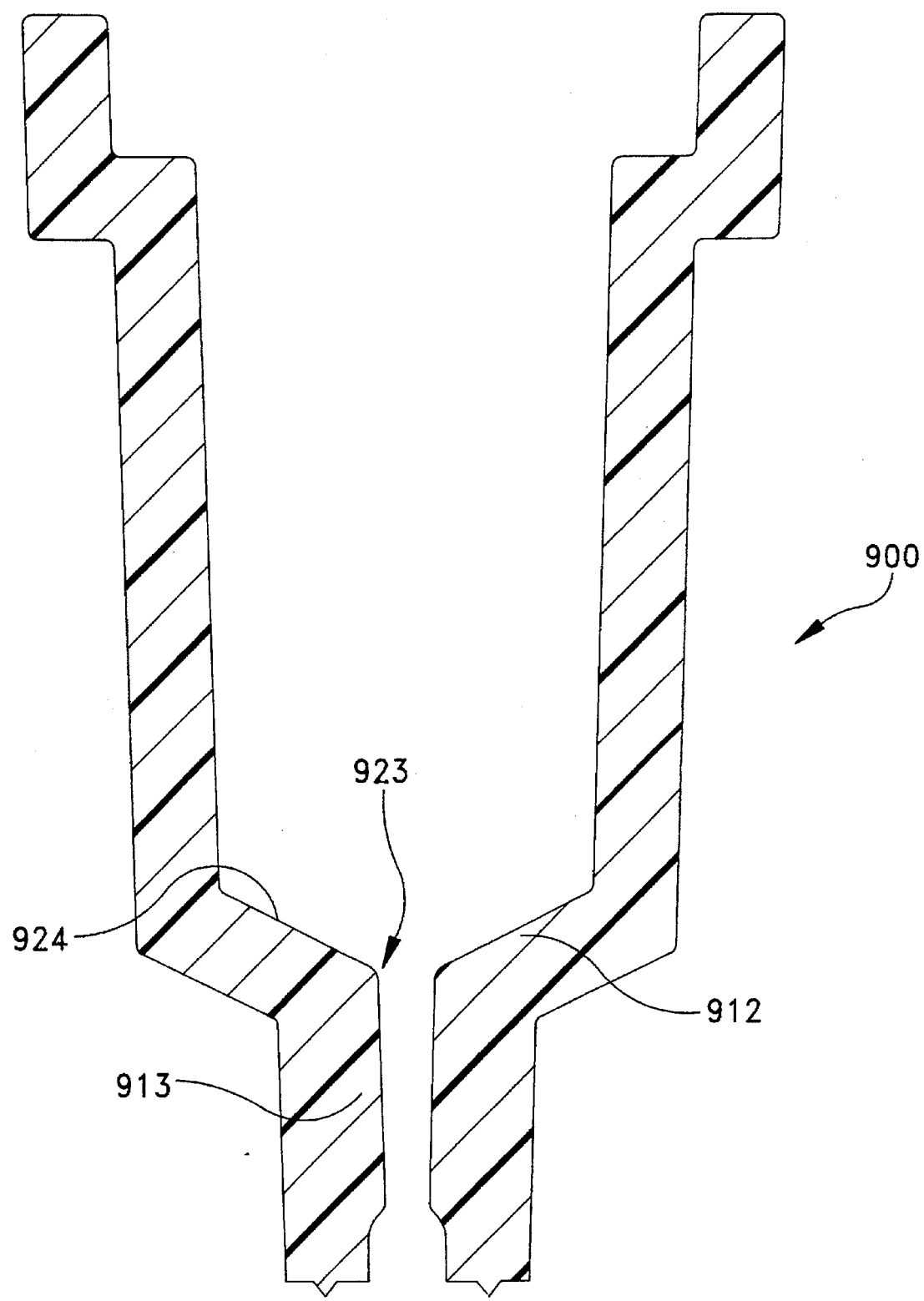
FIG. 19 is an alternative embodiment of the fluid receptacle.

The present invention may be embodied in other specific forms, or be modified or changed without departing from the essential spirit or scope thereof. For example, and referring now to FIG. 19, fluid receptacle 900 may comprise a flared end wall 912 that projects outwardly from free end 923 of nozzle 913. Flared end wall 912 defines an angled inner surface 924 that is adapted to prevent capillary action. With this embodiment, no annular recess is provided around nozzle 913. In all other respects, fluid receptacle 900 is identical to fluid receptacle 400.

Figure 20:
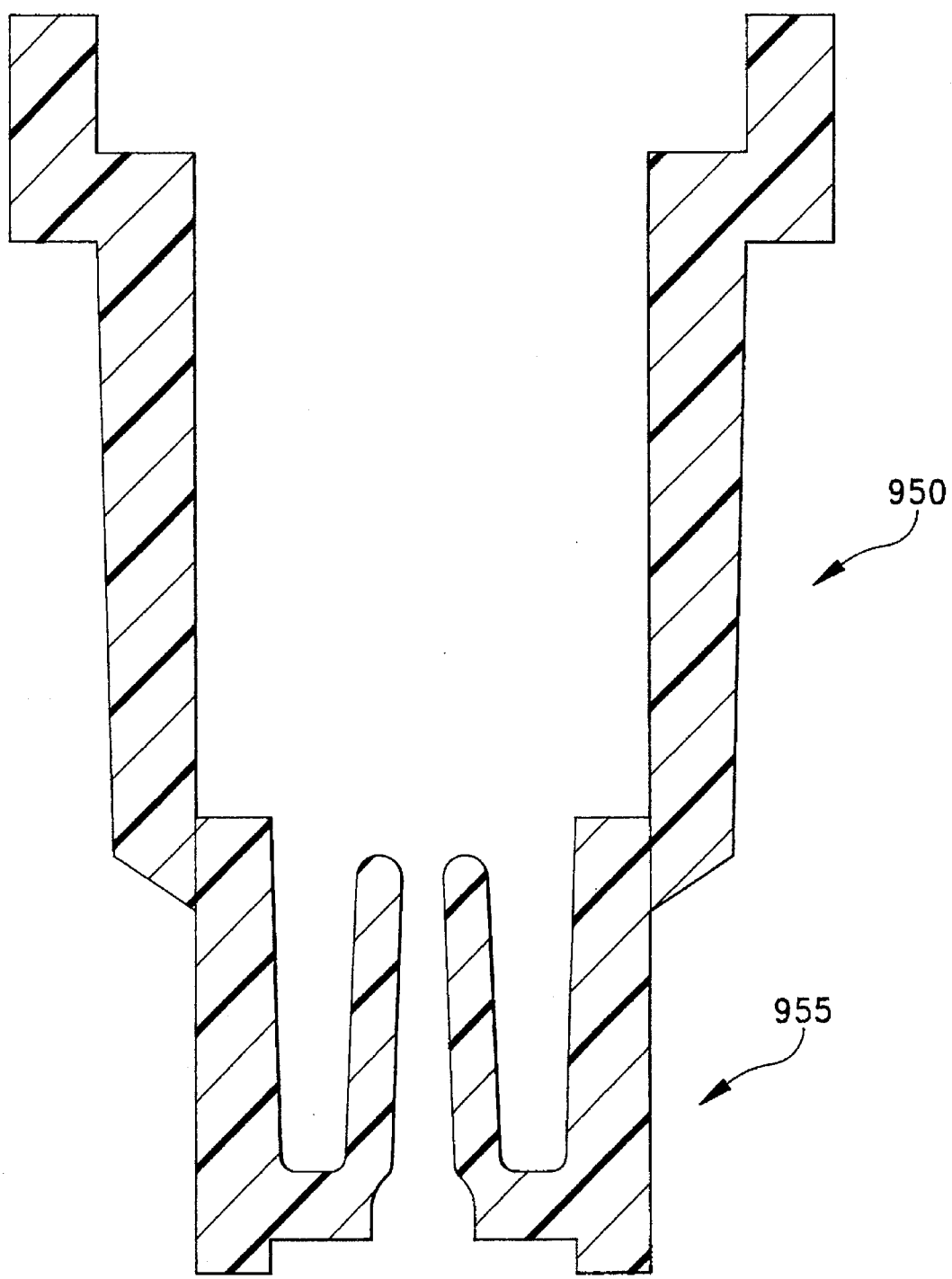
FIG. 20 is another alternative embodiment of the fluid receptacle.

As shown in FIG. 20, fluid receptacle 950 may be formed as a separate part and subsequently assembled to fluid receptacle 400. In this alternative embodiment, conduit engaging portion 955 comprises a metal alloy such as either steel, brass, or bronze, etc. In all other respects, receptacle 950 functions in the same manner as fluid receptacle 950 disclosed hereinabove.

Figure 21:
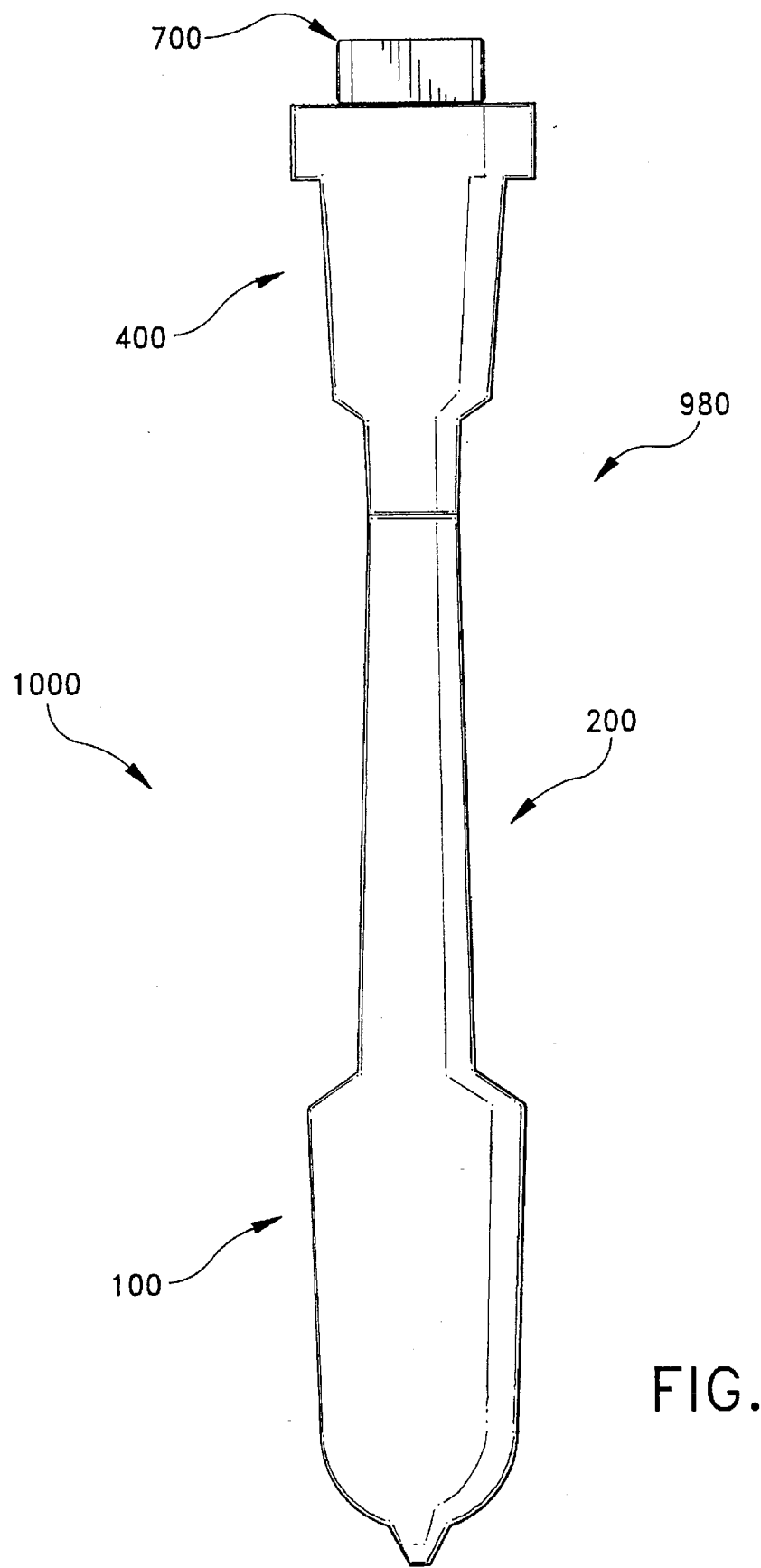
FIG. 21 is an alternative construction of the present invention formed from a one-piece molded housing.

As shown in FIG. 21, gas reservoir 100, fluid conduit 200 and fluid receptacle 400 may all be molded as a single subassembly 980. Subassembly 980 in turn may have absorbent material 500, cap 600, and pin 700 assembled to it to form monitor 1000 in a manner similar to that disclosed in connection with the preferred embodiment.

Advantages of the Invention

A primary advantage of the present invention is the provision of an improved time-temperature monitoring device suitable for use over a broad range of temperatures.

Another advantage of the present invention is the provision of an improved time-temperature monitoring device that indicates the accumulated time during which the ambient temperature adjacent to the monitor is above a predetermined reference temperature.

Still another advantage of the present invention is the provision of an improved time-temperature monitoring device that is capable of being conveniently located in a shipping container or vehicle.

Yet another advantage of the present invention is the provision of an improved time-temperature monitoring device that is tamper proof.

A further advantage of the present invention is the provision of an improved time-temperature monitoring device that is suitable for use with a variety of perishable items.

A still further advantage of the present invention is the provision of an improved time-temperature monitoring device that is not required to be subjected to temperatures below 32° F. (0° C.) prior to use.

Another advantage of the present invention is the provision of an improved time-temperature monitoring device that incorporates a fluid capable of non-Newtonian flow behavior.

And another advantage of the present invention is the provision of an improved time-temperature monitoring device that may be economically disposed of after use.

Yet another advantage of the present invention is the provision of an improved method for monitoring, recording, and indicating the accumulated time during which the ambient temperature adjacent to perishable goods is above a predetermined reference temperature.

It is to be understood that the present invention is by no means limited to the particular construction herein disclosed and/or shown in the drawings, but also comprises any modifications or equivalents within the scope of the claims.

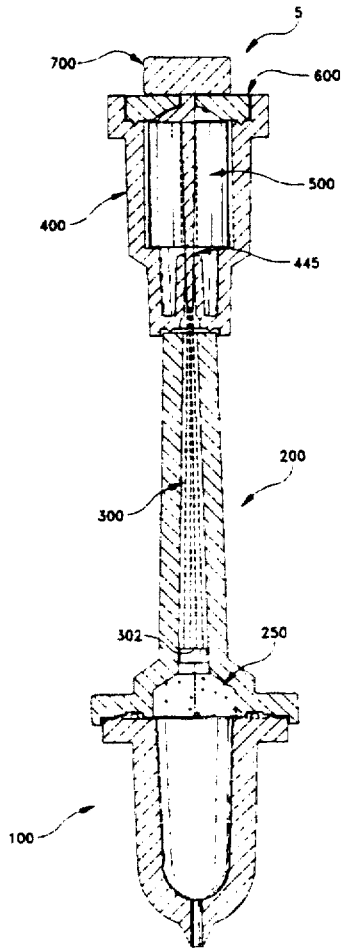

What is claimed is:

1. A time and temperature monitor for indicating the amount of accumulated time during which the ambient temperature adjacent to said monitor is above a predetermined temperature, said monitor comprising:
    a viscous, non-Newtonian fluid wherein said viscosity of said fluid: (i) has a first value, when said viscous fluid's temperature is below said predetermined temperature, that prevents said viscous fluid from flowing under the influence of a biasing force, and (ii) has a second value, when said viscous fluid's temperature is above said predetermined temperature, that allows said viscous fluid to flow under the influence of said biasing force;
    means for defining a flow path for a portion of said viscous fluid wherein said means for defining a flow path is adapted to inhibit said viscous fluid from flowing at temperatures below said predetermined temperature, and also creates a terminal end portion of said viscous fluid;
    means for biasing said viscous fluid within said means for defining a flow path so as to provide said biasing force on said viscous fluid;
    means for viewing said terminal end portion of said viscous fluid;
    means for indicating a relative position of said terminal end portion over a plurality of time intervals, wherein said indicating means are disposed adjacent to said means for defining a flow path and further wherein said indicating means are calibrated so as to indicate the passage of time as a function of the rate of flow of said viscous fluid through said means for defining a flow path; and
    means for regulating the flow of said viscous fluid, disposed in fluid communication with said means for defining a flow path, said means for regulating the flow of said viscous fluid being adapted to provide a shearing force to said viscous fluid so as to constrain the flow thereof at temperatures above said predetermined temperature.

2. A monitoring device according to claim 1 wherein said viscous non-Newtonian fluid comprises a polydispersed colloidal polymer solution.

3. A monitoring device according to claim 2 wherein said polydispersed colloidal polymer solution comprises a fluid-gel comprising purified water, a water-soluble polymer, a water-miscible organic solvent, a salt, a freezing point depressing liquid that is miscible in said water.

4. A monitoring device according to claim 3 wherein said polydispersed colloidal polymer solution further comprises a contrasting agent.

5. A monitoring device according to claim 3 comprising a water soluble polymer selected from the group consisting of starch products and natural gums, polyvinyl alcohol, cellulose ethers, ethylene oxide polymers, acrylamide polymers, acrylic acid polymers, polyethylenimine, and polyvinylpyrrolidone polymers.

6. A monitoring device according to claim 3 comprising a water-miscible organic solvent selected from the group consisting of anhydrous ethanol, 2-propanol, ethylene glycol, propylene glycol, glycerin, and acetone.

7. A monitoring device according to claim 3 wherein said water soluble polymer comprises hydroxyethyl cellulose.

8. A monitoring device according to claim 3 wherein said water soluble polymer comprises poly(ethylene oxide).

9. A monitoring device according to claim 3 wherein said water miscible organic solvent comprises propylene glycol.

10. A monitoring device according to claim 4 wherein said contrasting agent comprises food coloring dye.

11. A monitoring device according to claim 1 wherein said means for defining a flow path comprise a tapered conduit, wherein said conduit is tapered so as to inhibit the flow of said viscous fluid when said viscous fluid is below said reference temperature.

12. A monitoring device according to claim 1 wherein said means for biasing said viscous fluid comprise a reservoir disposed in sealed fluid communication with said means for defining a flow path, said reservoir including a pressurized elastic fluid disposed therein, said elastic fluid being in fluid communication with said terminal end portion of said viscous fluid.

13. A monitoring device according to claim 1 comprising a clear polymer material.

14. A monitoring device according to claim 1 wherein said monitor is disposed within a separate container means adapted for maintaining said monitor in a preferred position and comprising means for viewing said terminal end portion of said viscous fluid.

15. A monitoring device according to claim 1 wherein said means for regulating the flow of said viscous fluid further includes absorbent means for absorbing said viscous fluid after said viscous fluid has exited from said means for regulating.

16. A monitoring device according to claim 1 wherein said means for regulating the flow of said viscous fluid comprise a nozzle having a central passageway comprising a first relatively large diameter, a second relatively smaller diameter whereby a constricted region is created therebetween, said constricted region comprising an orifice adapted to cause said viscous fluid to exhibit toroidal flow vortex streamlines therebelow so as to constrain the flow of said viscous fluid at temperatures above said predetermined temperature.

17. A monitoring device according to claim 16 wherein an actuation pin is releasably engaged within said orifice prior to activation of said monitor, said pin extending through, and sealingly engaging said orifice so that when said pin is withdrawn therefrom, said viscous fluid is free to flow through said means for defining a flow path and out of said orifice under the influence of said biasing means.

18. A time and temperature monitor adapted for indicating the accumulated time during which the ambient temperature adjacent to said monitor is above a predetermined reference temperature, said monitor comprising:
    a viscous, non-Newtonian fluid wherein said viscosity of said fluid: (i) has a first value, when said viscous fluid's temperature is below said predetermined temperature, that prevents said viscous fluid from flowing under the influence of a biasing force, and (ii) has a second value, when said viscous fluid's temperature is above said predetermined temperature, that allows said viscous fluid to flow under the influence of said biasing force;
    a transparent conduit comprising a first open end, a second open end, and a tapered central passageway adapted to inhibit said viscous fluid from flowing at temperatures below said predetermined temperature, and including a portion of said viscous fluid disposed within said passageway and having at least a terminal end portion of said viscous fluid visible therein, said conduit further comprising indicia positioned adjacent to the outer surface of said conduit, said indicia being adapted for indicating intervals of time;

a chamber disposed adjacent to said second open end of said tapered conduit in sealed and pressurized fluid communication with said portion of said viscous fluid disposed within said tapered conduit, said viscous fluid being biased within said tapered conduit by a pressurized elastic fluid disposed within said chamber and said passageway; and a nozzle comprising an orifice adapted to apply a shearing force to said viscous fluid so as to control the flow of said viscous fluid out of said tapered conduit at temperatures above said predetermined temperature, said nozzle being disposed within a fluid receptacle disposed in fluid communication with said first open end of said tapered conduit.

19. A monitoring device according to claim 14 wherein an actuation pin is releasably engaged within said fluid receptacle and said orifice prior to activation of said monitor, said pin extending through, and sealingly engaging said orifice so that when said pin is withdrawn therefrom, said viscous fluid is free to flow through said tapered conduit, out of said orifice, and into said fluid receptacle under the influence of said pressurized elastic fluid.

20. A method for monitoring the amount of accumulated time during which the ambient temperature adjacent to temperature sensitive item is above a predetermined temperature, said method comprising the steps of:

(A) providing a time-temperature monitor comprising:

a viscous, non-Newtonian fluid wherein said viscosity of said fluid: (i) has a first value, when said viscous fluid s temperature is below said predetermined temperature, that prevents said viscous fluid from flowing under the influence of a biasing force, and (ii) has a second value, when said viscous fluid's temperature is above said predetermined temperature, that allows said viscous fluid to flow under the influence of said biasing force;

a transparent conduit comprising a first open end, a second open end, and a tapered central passageway adapted to inhibit said viscous fluid from flowing at temperatures below said predetermined temperature, and including a portion of said viscous fluid disposed within said passageway and having at least a terminal end portion of said viscous fluid visible therein, said conduit further comprising indicia positioned adjacent to the outer surface of said conduit, said indicia being adapted for indicating intervals of time;

a chamber disposed adjacent to said second open end of said tapered conduit in sealed and pressurized fluid communication with said portion of said viscous fluid disposed within said tapered conduit, said viscous fluid being biased within said tapered conduit by a pressurized elastic fluid disposed within said chamber and said passageway; and a nozzle comprising an orifice adapted to apply a shearing force to said viscous fluid so as to control the flow of said viscous fluid out of said tapered conduit at temperatures above said predetermined temperature, said nozzle being disposed within a fluid receptacle disposed in fluid communication with said first open end of said tapered conduit, and further wherein an actuation pin is releasably engaged within said fluid receptacle and said orifice prior to activation of said monitor, said pin extending through, and sealingly engaging said orifice so that when said pin is withdrawn therefrom, said viscous fluid is free to flow through said tapered conduit, out of said orifice, and into said fluid receptacle under the influence of said pressurized elastic fluid;

(B) conditioning said time-temperature monitor wherein said monitor is exposed to a temperature below said predetermined temperature for a time sufficient to establish thermal equilibrium therein and thereafter removing said conditioned monitor from said conditioning environment;

(C) activating said monitor whereby said pin is removed from said orifice;

(D) recording the position of said terminal end portion of said viscous fluid relative to said indicia;

(E) placing said monitor adjacent to said perishable items;

(F) transporting said perishable items; and (G) noting again the position of said terminal end portion of said viscous fluid relative to said indicia.

* * * * *

UNITED STATES PATENT AND TRADEMARK OFFICE
CERTIFICATE OF CORRECTION

PATENT NO.  : 5,662,419
DATED       : Sept. 2, 1997
INVENTOR(S) : David J. Lamagna It is certified that error appears in the above-identified patent and that said Letters Patent is hereby corrected as shown below:

The title page should be deleted to appear as per attached title page.

Signed and Sealed this

Eighteenth Day of November 1997

Attest:

BRUCE LEHMAN

*Attesting Officer*  *Commissioner of Patents and Trademarks*

United States Patent [19]
Lamagna

[11] Patent Number: 5,662,419
[45] Date of Patent: Sep. 2, 1997

[54] TIME-TEMPERATURE MONITOR AND RECORDING DEVICE AND METHOD FOR USING THE SAME

[76] Inventors: David J. Lamagna, P.O. Box 5160 Andover, MA. 01810

[21] Appl. No.: 487,276

[22] Filed: Jun. 7, 1995

[51] Int. Cl.$^6$ ............................................. G01K 11/06
[52] U.S. Cl. ........................ 374/160; 374/102; 374/106; 426/88; 116/219
[58] Field of Search ............................. 374/101, 102, 374/104, 105, 106, 160, 161, 162; 116/217, 218, 219; 426/88

[56] References Cited

U.S. PATENT DOCUMENTS

| | | |
|---|---|---|
| 3,082,624 | 3/1963 | Renier .................. 374/102 |
| 3,336,212 | 8/1967 | Nicholas et al. ........ 374/102 |
| 3,362,834 | 1/1968 | Kaye ..................... 116/219 |
| 3,954,011 | 5/1976 | Manske .................. 116/219 |
| 3,965,741 | 6/1976 | Wachtell et al. ........ 374/160 |
| 4,327,117 | 4/1982 | Lenack et al. .......... 426/88 |
| 4,382,700 | 5/1983 | Youngren ................ 374/102 |
| 4,432,656 | 2/1984 | Allmendinger .......... 426/88 |
| 4,488,822 | 12/1984 | Brennan ................. 374/101 |

Primary Examiner—G. Bradley Bennett

[57] ABSTRACT

A time-temperature monitor is provided that is adapted for indicating the amount of accumulated time during which the ambient temperature adjacent to the monitor is above a predetermined temperature. The time-temperature monitor comprises a viscous, non-Newtonian fluid biased within a flow path defining element, with the rate of flow therethrough being regulated by a constricting orifice disposed in a nozzle that is positioned in fluid communication with the flow path defining element.

20 Claims, 16 Drawing Sheets